(12) United States Patent
Ho et al.

(10) Patent No.: US 10,820,323 B2
(45) Date of Patent: Oct. 27, 2020

(54) BEAM INDICATION METHOD FOR MULTIBEAM WIRELESS COMMUNICATION SYSTEM AND ELECTRONIC DEVICE USING THE SAME

(71) Applicant: Industrial Technology Research Institute, Hsinchu (TW)

(72) Inventors: Chung-Lien Ho, Taoyuan (TW); Ren-Jr Chen, Hsinchu (TW); Zanyu Chen, Taoyuan (TW); Wen-Chiang Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 174 days.

(21) Appl. No.: 15/933,381

(22) Filed: Mar. 23, 2018

(65) Prior Publication Data
US 2019/0045494 A1 Feb. 7, 2019

Related U.S. Application Data

(60) Provisional application No. 62/541,118, filed on Aug. 4, 2017.

(51) Int. Cl.
*H04W 72/04* (2009.01)
*H04W 16/28* (2009.01)
*H04W 76/27* (2018.01)

(52) U.S. Cl.
CPC ......... *H04W 72/046* (2013.01); *H04W 16/28* (2013.01); *H04W 72/042* (2013.01); *H04W 76/27* (2018.02)

(58) Field of Classification Search
CPC . H04W 72/046; H04W 76/27; H04W 72/042; H04W 16/28; H04L 5/0053; H04B 7/0695; H04B 7/0626; H04B 7/0408
See application file for complete search history.

(56) References Cited

U.S. PATENT DOCUMENTS

| | | |
|---|---|---|
| 9,137,698 B2 | 9/2015 | Li et al. |
| 9,237,475 B2 | 1/2016 | Josiam et al. |

(Continued)

FOREIGN PATENT DOCUMENTS

| | | |
|---|---|---|
| CN | 103688474 | 3/2014 |
| CN | 105721033 | 6/2016 |

(Continued)

OTHER PUBLICATIONS

"Office Action of Taiwan Counterpart Application", dated Jan. 10, 2019, p. 1-p. 6.

(Continued)

*Primary Examiner* — Ivan O Latorre
(74) *Attorney, Agent, or Firm* — JCIPRNET

(57) ABSTRACT

An aspect of the disclosure includes a beam indication method for a multibeam wireless communication system, including: obtaining a number of candidate beams and a number of active beams to determine a plurality of beam groups, wherein the beam groups are selections of the active beams from the candidate beams; extracting a plurality of sets of the beam groups from the beam groups, wherein the plurality of sets of the beam groups comprises a first beam group set; assigning a first indicator to the first beam group set; assigning a beam indicator to one of the beam groups in the first beam group set to generate a codebook for beam indication according to the first indicator and the beam indicator.

28 Claims, 23 Drawing Sheets

(56) References Cited

U.S. PATENT DOCUMENTS

| | | | |
|---|---|---|---|
| 10,326,512 B2* | 6/2019 | Li | H04B 7/0456 |
| 2009/0097395 A1 | 4/2009 | Zhang et al. | |
| 2013/0163457 A1* | 6/2013 | Kim | H04W 24/02 370/252 |
| 2015/0282122 A1* | 10/2015 | Kim | H04L 25/03898 370/329 |
| 2016/0065279 A1* | 3/2016 | Wang | H04B 7/0456 375/267 |
| 2016/0211899 A1* | 7/2016 | Yang | H04B 17/318 |
| 2016/0323022 A1* | 11/2016 | Rahman | H04B 7/0469 |
| 2017/0208613 A1 | 7/2017 | Nam et al. | |
| 2018/0042000 A1* | 2/2018 | Zhang | H04B 7/04 |
| 2018/0062724 A1* | 3/2018 | Onggosanusi | H04L 5/0055 |
| 2018/0131486 A1* | 5/2018 | Liu | H04B 7/063 |
| 2018/0139791 A1* | 5/2018 | Bai | H04L 7/0079 |
| 2018/0234148 A1* | 8/2018 | Li | H04B 7/0469 |
| 2018/0331805 A1* | 11/2018 | Xia | H04B 7/0695 |
| 2019/0036584 A1* | 1/2019 | Chang | H04L 5/0048 |
| 2019/0165983 A1* | 5/2019 | Nakayama | H04B 7/0413 |
| 2019/0312623 A1* | 10/2019 | Park | H04B 7/0626 |
| 2019/0341979 A1* | 11/2019 | Gao | H04B 7/0413 |
| 2019/0341981 A1* | 11/2019 | Park | H04B 7/0639 |

FOREIGN PATENT DOCUMENTS

| | | |
|---|---|---|
| CN | 106452536 | 2/2017 |
| CN | 106685496 | 5/2017 |
| WO | 2016044994 | 3/2016 |

OTHER PUBLICATIONS

ZTE Corporation, et al., "Beam selection and CSI acquisition for NR MIMO," 3GPP TSG RAN WG1 Meeting #86, Aug. 2016, pp. 1-6.

Nokia, Alcatel-Lucent Shanghai Bell, "On procedures for beam selection and feedback signaling," 3GPP TSG-RAN WG1#86, Aug. 2016, pp. 1-5.

"3rd Generation Partnership Project; Technical Specification Group Radio Access Network; Study on New Radio (NR) access technology (Release 14)," 3GPP TR 38.912 V14.1.0, Jun. 2017, pp. 1-74.

Zhouyue PI, et al., "An Introduction to Millimeter-Wave Mobile Broadband Systems," IEEE Communications Magazine, Jun. 2011, pp. 101-107.

Wonil Roh, et al., "Millimeter-Wave Beamforming as an Enabling Technology for 5G Cellular Communications: Theoretical Feasibility and Prototype Results," IEEE Communications Magazine, Feb. 2014, pp. 106-113.

Bei Yin, et al., "High-Throughput Beamforming Receiver for Millimeter Wave Mobile Communication," IEEE Global Communications Conference, Dec. 2013, pp. 3697-3702.

Sridhar Rajagopal, et al., "Antenna Array Design for Multi-Gbps mmWave Mobile Broadband Communication," IEEE Global Telecommunications Conference, Dec. 2011, pp. 1-6.

Farooq Khan, et al., "Millimeter-wave Mobile Broadband with Large Scale Spatial Processing for 5G Mobile Communication," IEEE Fiftieth Annual Allerton Conference, Oct. 2012, pp. 1517-1523.

Taeyoung Kim, et al., "Tens of Gbps Support with mmWave Beamforming Systems for Next Generation Communications," IEEE Global Communications Conference, Dec. 2013, pp. 3685-3690.

"Office Action of China Counterpart Application," dated Mar. 19, 2020, p. 1-p. 8.

* cited by examiner

BEAM INDICATION METHOD FOR MULTIBEAM WIRELESS COMMUNICATION SYSTEM AND ELECTRONIC DEVICE USING THE SAME

CROSS-REFERENCE TO RELATED APPLICATION

This application claims the priority benefit of U.S. provisional application Ser. No. 62/541,118, filed on Aug. 4, 2017. The entirely of the above-mentioned patent application is hereby incorporated by reference herein and made a part of this specification.

TECHNICAL FIELD

This disclosure is directed to a beam indication method for a multibeam wireless communication system and an electronic device using the same method.

BACKGROUND

As a wireless communication system of a next generation will require better performance, various aspects of a next generation wireless communication system will be improved. High-frequency millimeter waves will greatly increase wireless capacity and speeds for the next generation wireless communication system. Since the next generation communication system will perform transmission in a higher carrier frequency, propagations of the electromagnetic waves at a higher frequency will experience a greater path loss. For example, the attenuations of electromagnetic waves around the millimeter wave (mmWave) frequency range would be significantly higher than the attenuation around a micro wave frequency range. Thus, beamforming could be required to transmit in the mmWave frequency range.

FIG. 1 illustrates examples of radiation patterns of different transmission wavelengths. In general, a communication system operating in a microwave frequency and having wavelengths in the centimeter range (i.e. cmWave) tends to have a smaller number of antennas. The radiation pattern of a single microwave frequency antenna 101 tends to be long distance and has a broad field-of-view (FoV) coverage. Such radiation pattern would be typical for a 3G/4G communication system that uses the micro-wave band with smaller number of base station (BS) antennas to achieve a higher SNR for received signals. However, low data rate because of using a small bandwidth (BW) exists in such system. To increase the data rate by using a larger BW, the mmWave band has been considered for a future communication system (e.g. 5G systems). The radiation pattern of a single mmWave single frequency antenna 102 covers a shorter distance; however, the mmWave radiation pattern with a related narrower FoV coverage 103 as the result of mmWave beamforming could be extended by using an mmWave antenna array for beamforming under the same transmitted power. To achieve a broader FoV coverage than a 3G/4G communication system, a number of beams 104 may be used at a BS, and a beam sweep mechanism for the BS beams may be considered. Each of the BS beams 104 may have a different beam sequence ID (i.e. $q^{th}$ beam has beam sequence $ID_q$) for the beam sweep. In general, an mmWave communication system that uses a small sized antenna array tends to have a shorter distance and a broad coverage; whereas, an mmWave communication system that uses a larger sized antenna array tends to have a longer distance and a narrower coverage.

A New Radio (NR) access technology studied in Third Generation Partnership Project (3GPP) can support a wider range of mmWave band from 1 GHz up to 100 GHz. For utilization of multiple beams with different beam patterns, beam management procedures should be implemented to adopt a proper beam at the proper timing for communication between a BS and a UE. Herein, some of detailed description of these next generation access technologies could be found in 3GPP TR 38.912 which is incorporated by reference for supplementing the terms and concepts of the disclosure. For example, FIGS. 2A, 2B, and 2C illustrate an example of a downlink (or DL) beam management procedure in different phases. A transmit (or Tx)/receive (or Rx) beams alignment procedure for aligning Tx beams of BS and Rx beams of UE is performed in P1 procedure of downlink beam management procedures as shown in FIG. 2A. A P1 procedure may be conducted periodically, and the periodic reference signal could be used in the P1 procedure. In the P1 procedure, a BS 210 may sweep a set of Tx beams $B_0$-$B_3$ and transmit a reference signal via each of the Tx beams $B_0$-$B_3$. The reference signal could be, for example, a NR synchronization signal (NR-SS) or a channel state information reference signal (CSI-RS). A user equipment (UE) 230 may sweep a set of Rx beams $b_0$-$b_3$ and measure, by each of the Rx beams $b_0$-$b_3$, the reference signals transmitted from the BS. The P1 procedure is used to enable the UE measurement on different Tx beams $B_0$-$B_3$ to support selection of Tx beam(s) of BS and Rx beam(s) of UE. Furthermore, a BS Tx beam refinement procedure for refining Tx beam(s) of BS is performed in a P2 procedure of downlink beam management procedures as shown in FIG. 2B. In the P2 procedure, the UE 230 is enabled to measure a set of Tx beams of the BS 210 by one UE Rx beam (such as $b_1$ illustrated in FIG. 2B), wherein the set of Tx beams utilized in UE measurement in the P2 procedure is possibly smaller than the set of Tx beams utilized in the P1 procedure. For example, the P2 procedure is used to enable UE measurement on different Tx beams $B_0$-$B_2$ of the BS 210 to further refine Tx beam(s) selected in the P1 procedure. Moreover, a UE Rx beam refinement procedure for refining Rx beam of UE is performed in a P3 procedure of downlink beam management procedures as shown in FIG. 2C. The P3 procedure enables the UE 230 to measure the same Tx beam of the BS 230 by different UE Rx beams (such as $b_1$, $b_2$, $b_3$, and $b_4$ illustrated in FIG. 2C). For example, the P3 procedure is used to enable UE measurement on the same Tx beams $B_1$ of the BS 210 to further refine UE Rx beam selected in the P1 procedure. In addition, the P2 procedure and the P3 procedure may be conducted periodically or aperiodically, and the periodic reference signal or the aperiodic reference signal could be used in the P2 procedure and the P3 procedure.

On the other hand, beam management procedures may also be applied to uplink cases. FIGS. 3A, 3B, and 3C illustrate an example of an uplink (or UL) beam management procedure in different phases. The U1 procedure, the U2 procedure, and the U3 procedure are similar to the P1 to P3 procedures stated above respectively except that reference signal(s) is/are transmitted from the UE 330 to the BS 310. In FIG. 3A, in the U1 procedure, the UE 330 may sweep the Tx beams $b_0$-$b_3$ and transmit the reference signal via each of the Tx beams $b_0$-$b_3$, such that the BS 310 may measure beam qualities by sweeping the Rx beams $B_0$-$B_3$ to support selection of Tx beam(s) of the UE and Rx beam(s) of the BS. In FIG. 3B, in the U2 procedure, the UE 330 may transmit the reference signal via one Tx beam $b_1$, and the BS 310 may measure beam qualities by sweeping the Rx beams $B_0$-$B_3$ to refine the Rx beam(s) of the BS 310. In FIG. 3C, in the U3 procedure, the UE 330 may sweep the Tx beams $b_0$-$b_3$ and transmit the reference signal, and the BS 310 may measure beam qualities by one Rx beams $B_1$ to refine the Tx beam(s) of the UE 330. The above stated reference signals utilized in UL beam management procedure could be, for example, a sounding reference signal (SRS).

Herein, Tx/Rx beam correspondence at BS and UE would be described. If a BS is able to determine its Rx beam for an UL reception according to DL measurements on Tx beams of the BS, or if the BS is able to determine its Tx beam for DL transmission according to UL measurement on Rx beams of the BS, the Tx/Rx beam correspondence is hold at the BS. Besides, if the UE is able to determine its Tx beam for UL transmission according to DL measurements on Rx beams of the UE, or if the UE is able to determine its Rx beam for DL reception according to UL measurements on Tx beams of the UE, the Tx/Rx beam correspondence is hold at the UE. That is, after DL measurement performed in the DL beam management procedures, the BS is able to determine Rx beam(s) of the BS for UL reception if the Tx/Rx beam correspondence is hold at the BS. After DL measurement performed in the DL beam management procedures, the UE is able to determine Tx beam(s) of the UE for UL reception if the Tx/Rx beam correspondence is hold at the BS. Otherwise, the UL beam management procedures may be necessary if the Tx/Rx beam correspondence is not hold at the UE or the BS.

A beam pair link (BPL) is defined based on a UE measurement or a BS measurement on reference signal(s) between a UE and a BS. FIGS. 4A and 4B illustrate examples of BPLs between a BS 410 and a UE 430. In FIG. 4A, the BPLs are established based on beam measurement performed on SS or CSI-RS via the Rx beams $b_0$-$b_3$ of the UE 430 and the Tx beams $B_0$-$B_3$ of the BS 410. For example, a beam pair link between the Tx beam $B_2$ and Rx beam $b_2$ may be established based on the DL measurement performed through the Rx beams $b_2$ of the UE 430 and the Tx beams $B_2$ of the BS 410. A Rx beam of the UE 430 and a preferred Tx beam of the BS 410 would be associated with each other through sending a measurement report by the UE 430. In FIG. 4B, the BPLs are established based on beam measurement performed on SRS via the Tx beams $b_0$-$b_3$ of the UE 430 and the Rx beams $B_0$-$B_3$ of the BS 410. A Tx beam of the UE 430 and a preferred Rx beam of the BS 410 would be associated with each other through UL measurements.

FIG. 4C illustrates an example of determining BPLs in a P1 procedure. When the UE 430 measures the Tx beams $B_0$-$B_3$ by the Rx beam $b_2$, the UE 430 may choose one or more Tx beams as preferred Tx beams which corresponds to the Rx beam $b_2$ according to the measurement results. Since the UE 430 has not had complete beam information in the P1 procedure in, for example, the initial access, the beam measurement may be performed based on the synchronization signal. That is, the beam measurement results may be reference symbol received power (RSRP) or channel state information (CSI) of synchronization signals transmitted by the Tx beams $B_0$-$B_3$. Hence, after respectively measuring the synchronization signals transmitted by the Tx beams $B_0$-$B_3$, if the UE 430 selects beam $B_2$ as a preferred beam which corresponds to the beam $b_2$, the UE 430 would transmit, via the beam $b_2$, a random access preamble (RAP) in a random access procedure to the BS 410 while the beam $B_2$ is being used. Thereafter, when the BS 410 receives the RAP of the UE 430 via beam $B_2$, a BPL between the beam $B_2$ and the beam $b_2$ may be established accordingly. After the BPL between the beam $B_2$ and the beam $b_2$ is established, the UE 430 may choose beam $b_2$ to perform a UL/DL transmission with the BS 410 if the BS 410 choose the beam $B_2$ to perform said transmission. Similarly, the BS 410 may choose beam $B_2$ to perform a UL/DL transmission with the UE 430 if the UE 430 choose the beam $b_2$ to perform said transmission.

BPLs may also be determined in a P2 or P3 (or joint P2 & P3) procedure. FIG. 4D illustrates an example of determining BPLs in a P2 (or P3) procedure. As shown in FIG. 4D, the beam measurement may be performed based on the reference signals such as CSI-RS. That is, the beam measurement results may be reference symbol received power (RSRP) or channel state information (CSI) of CSI-RS transmitted by the Tx beams $B_0$-$B_3$. Hence, when the UE 430 decides to choose beam $B_2$ as a preferred beam corresponding to the beam $b_2$ in the P2 (or P3) procedure after performing beam measurement based on the CSI-RS, the UE 430 would transmit, via a physical uplink control channel (PUCCH) and the beam $b_2$, a measurement report such as RSRP or CSI of CSI-RS transmitted via the beam $B_2$ to the BS 410. Thereafter, when the BS 410 receives the measurement report via beam $B_2$, a BPL (for example the BPL between the beam $B_2$ and the beam $b_2$) based on the measurement report may be established accordingly.

In general, quasi-co-location (QCL) assumption could be classified into some types with various time/frequency/spatial QCL parameter combinations. For example, the QCL parameters such as the Doppler shift, Doppler spread, average delay, and delay spread belonging time-frequency QCL may be grouped as Type A QCL. For another example, spatial correlation of the Tx/Rx configuration (e.g. beam) for Type D QCL could be one of spatial QCL parameter. Specifically, a spatial QCL may indicate relation between target RS antenna ports for beam measurement and reference RS antenna ports, and the purpose of spatial QCL may be assisting a UE to select a UE Rx beam. FIG. 5 illustrates an example of a demodulation reference signal (DM-RS) port quasi-co-located with several Tx beams of a BS. Assuming that the BPLs $B_0$-$b_0$, $B_1$-$b_1$, $B_1$-$b_2$, and $B_2$-$b_2$ are available at the BS 510 as shown in FIG. 5, the BS 510 may inform the QCL relation to the UE 530 by sending a QCL indication to the UE 530. Therefore, information of the selected UE Rx beams for DL DM-RS (and corresponding data packet) reception could be determined by the UE 530 based on the QCL indication describing the spatial QCL of DL DM-RS (i.e. target RS) antenna port(s) associated with CSI-RS (i.e. reference RS) antenna port(s) for DL beam management. For example, if a DM-RS port is quasi-co-located with Tx beams $B_1$ and $B_2$ (which is associated with CSI-RS port), the UE 530 would receive the corresponding DM-RS (and data) using the Rx beam $b_2$ (which has been beam pair linked to both of the Tx beams B and $B_2$) based on the QCL indication. On the other hand, if the DM-RS port is quasi-co-located with only the beam $B_1$, the UE 530 would receive the corresponding DM-RS (and data) using the Rx beams $b_1$ (which has been beam pair linked to the Tx beam $B_1$). That is, the QCL indication for UE Rx beam selection may include a beam indication.

FIGS. 6A, 6B, 6C, and 6D illustrate examples of schemes for beam indication based on previously transmitted CSI-RS resources. In order to inform the UE side 630 about the selected BS beam(s) at the BS side 610, the first scheme implements beam indication by using absolute timestamps as shown in FIG. 6A, wherein the timestamps could be, for example, time indexes of a frame, a slot, or an OFDM symbol. Each of the time indexes is associated with a corresponding CSI-RS resource. For distinguishing all of possible X time indexes assigned, each time index for beam indication would be encoded as a codeword of $\lceil \log_2 X \rceil$ bits. For example, assuming that each frame corresponding to one time index is configured to be corresponded to one BS Tx beam, at least 10 bits would be necessary for indicating one BS Tx beam if the number of the frames is 1024. The second scheme implements beam indication by using unique Tx beam indexes (i.e. beam ID) as shown in FIG. 6B. Each of the Tx beam indexes is associated with a corresponding CSI-RS resource. For distinguishing all of unique Y beam indexes, each beam index for beam indication would be encoded as a codeword of $\lceil \log_2 Y \rceil$ bits. For example, assuming the BS has ability for beamforming 64 capable beams, at least 6 bits would be necessary for indicating one BS Tx beam, wherein "capable" beams represent the beams available at BS/UE based on some requirements (e.g. carry frequency, cell coverage, 2D/3D beam direction, etc.) and/or capability (e.g. number of physical antennas, wavelength, size, etc.) in this disclosure. The third scheme implements beam indication by using CSI-RS resource indicators as shown in FIG. 6C. Each of the CSI-RS resource indicators is associated with a corresponding CSI-RS resource. For distinguishing all of unique Z CSI-RS resource indicators, each CSI-RS resource indicators for beam indication would be encoded as a codeword of $\lceil \log_2 Z \rceil$ bits. Apparently, the number of bits of the beam indication may be high overhead along with different factors (i.e., the number of the time indexes, the number of the capable beams, the number of CRIs) in the above three scheme, however, the high overhead beam indicator is not suitable for a downlink control information (DCI).

The fourth scheme implements beam indication by using a measurement indication (MI) tag as shown in FIG. 6D. After performing some beam management procedures mentioned above, the candidate beams $B_0$, $B_2$, $B_3$, $B_4$, $B_5$, $B_7$ and the active beams $B_2$, $B_4$, $B_5$ of BS side 610 as shown in FIG. 6D could be determined from total capable beams $B_0$-$B_7$ when applying the tag based MI scheme. After the candidate beams are determined, a unique tag may be allocated to each of the candidate beams $B_0$, $B_2$, $B_3$, $B_4$, $B_5$, $B_7$. In the case of FIG. 6D, when the BS side 610 selects three active Tx beams $B_2$, $B_4$, $B_5$ for data transmission, the BS side 610 must send the MI tags (i.e., [001], [011], [100]) respectively corresponding to active Tx beams $B_2$, $B_4$, $B_5$ to the UE side 630 for beam indication. That is, it would take $M\lceil \log_2 N \rceil = 3\lceil \log_2 6 \rceil = 9$ bits for the beam indication, wherein M is the number of active beams, N is the number of candidate beams, and $1 \leq M \leq N$. The MI tag scheme provides an efficient way to reduce the signaling overhead between a base station and a user equipment when the number of active beams M and the number candidate beams N are small. However, the signaling overhead between the base station and the user equipment would become more severe along with increment in the number of candidate beams N and/or the number active beams M.

However, when the BS wants to indicate multiple beams to the UE, multiple beam indicators are necessary by using the above four schemes, which may cause high signaling overhead and the larger indication latency.

SUMMARY

Accordingly, the disclosure is directed to a beam indication method for a multibeam wireless communication system and an electronic device using the same method.

In one of exemplary embodiments, the disclosure is directed to a beam indication method for a multibeam wireless communication system, and the method would include but no limited to: obtaining a number of candidate beams N and a number of active beams M to determine a plurality of beam groups, wherein the beam groups are selections of the M active beams from the N candidate beams, wherein $N>M \geq 1$; extracting a plurality of sets of the beam groups from the beam groups, wherein the plurality of sets of the beam groups comprises a first beam group set; assigning a first indicator to the first beam group set; assigning a beam indicator to one of the beam groups in the first beam group set to generate a codebook for beam indication according to the first indicator and the beam indicator.

In one of the exemplary embodiments, the disclosure is directed to an electronic device which would include not limit to: a storage medium, a transceiver, and a processor coupled to the storage medium, and configured to: obtain a number of candidate beams N and the number of active beams M to determine a plurality of beam groups, wherein the beam groups are selections of the M active beams from the N candidate beams, wherein $N>M \geq 1$; extract a plurality of sets of the beam groups from the beam groups, wherein the plurality of sets of the beam groups comprise a first beam group set; assign a first indicator to the first beam group set; and assign a beam indicator to one of the beam groups in the first beam group set to generate a codebook for beam indication according to the first indicator and the beam indicator.

In order to make the aforementioned features and advantages of the disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the disclosure and is therefore not meant to be limiting or restrictive in any manner. Also, the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
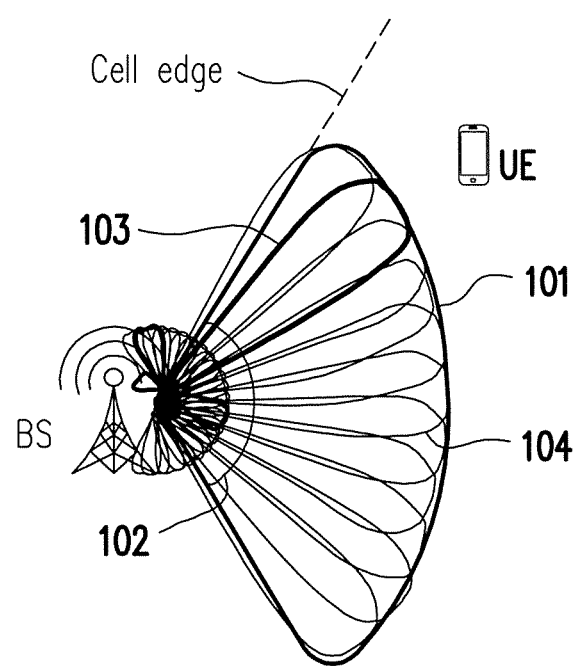
FIG. 1 illustrates examples of radiation patterns of different transmission wavelengths.
Figure 2A:
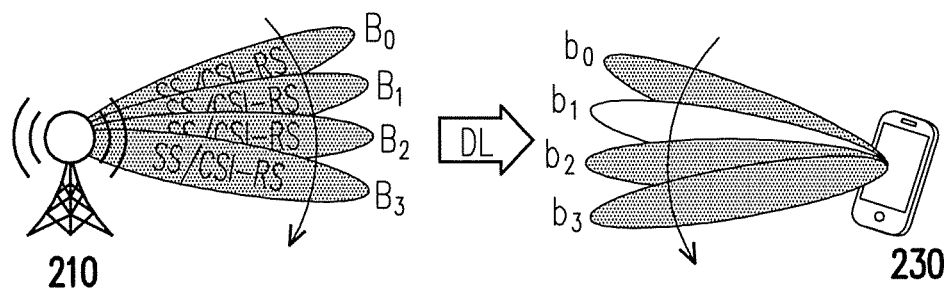
FIG. 2A illustrates an example of a P1 procedure of downlink beam management procedures.
Figure 2B:
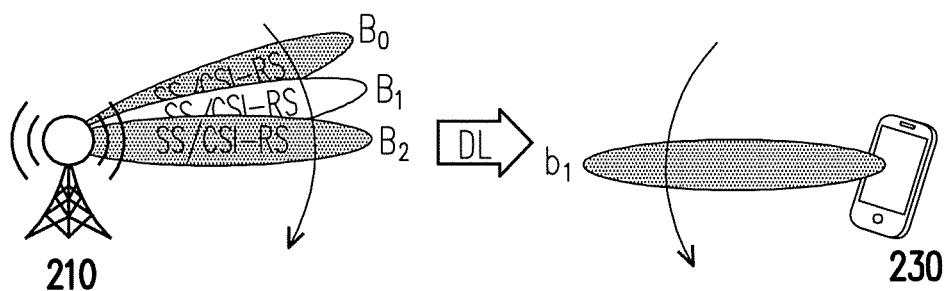
FIG. 2B illustrates an example of a P2 procedure of downlink beam management procedures.
Figure 2C:
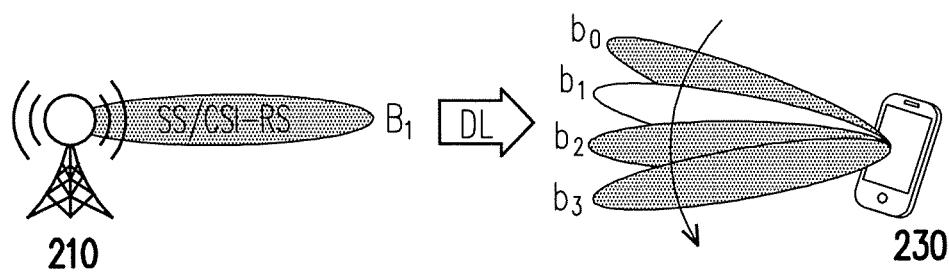
FIG. 2C illustrates an example of a P3 procedure of downlink beam management procedures.
Figure 3A:
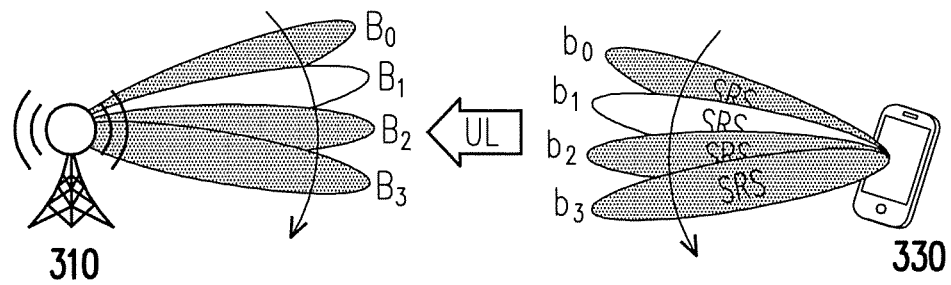
FIG. 3A illustrates an example of a U1 procedure of uplink beam management procedures.
Figure 3B:
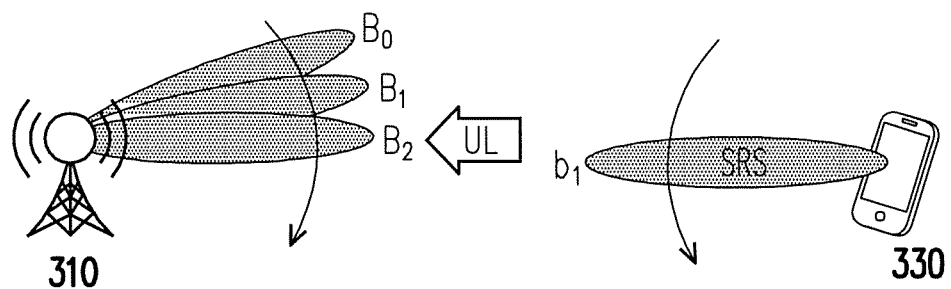
FIG. 3B illustrates an example of a U2 procedure of uplink beam management procedures.
Figure 3C:
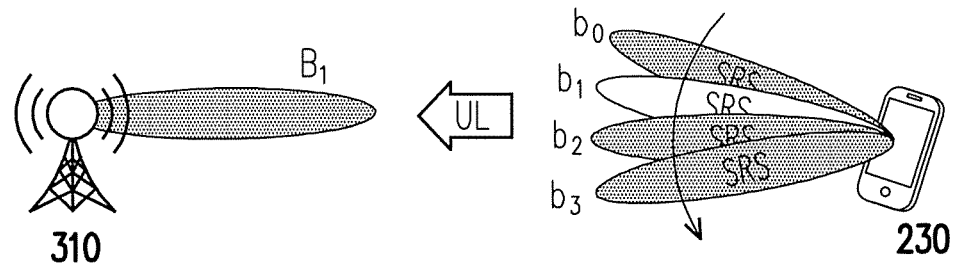
FIG. 3C illustrates an example of a U3 procedure of uplink beam management procedures.
Figure 4A:
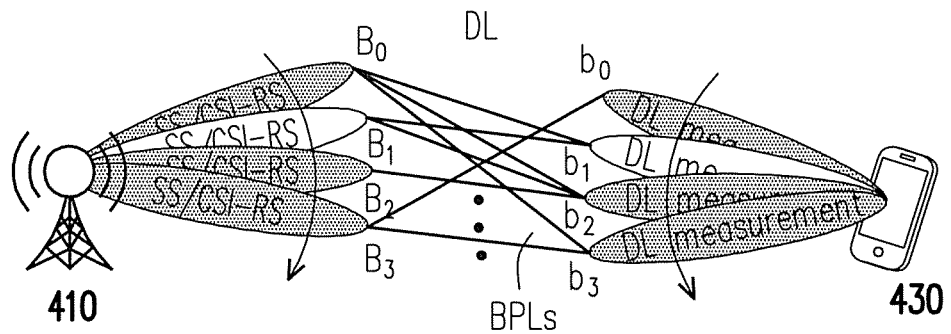
FIG. 4A illustrates an example of downlink BPLs between a BS and a UE.
Figure 4B:
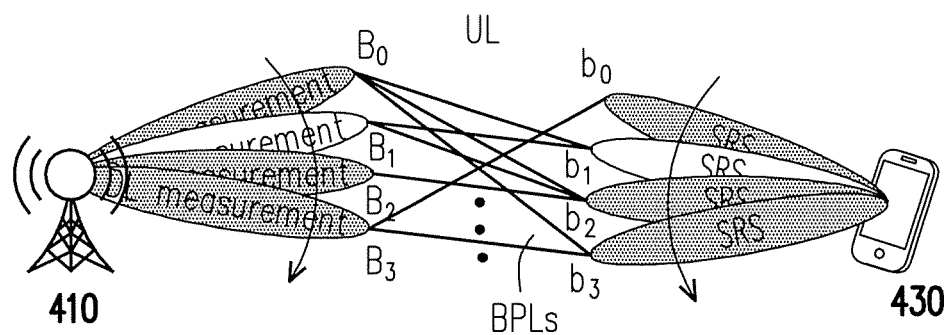
FIG. 4B illustrates an example of uplink BPLs between a BS and a UE.
Figure 4C:
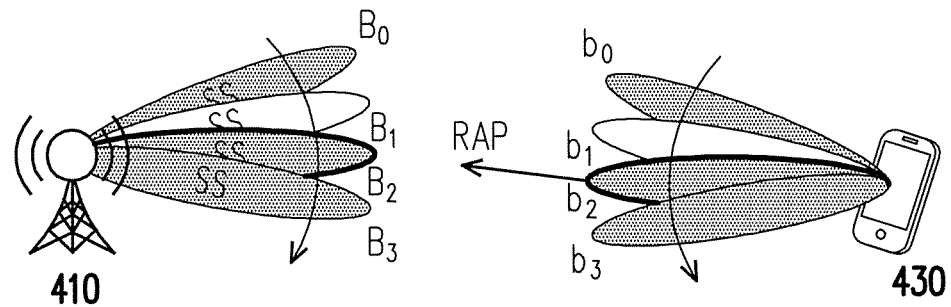
FIG. 4C illustrates an example of determining BPLs in a P1 procedure.
Figure 4D:
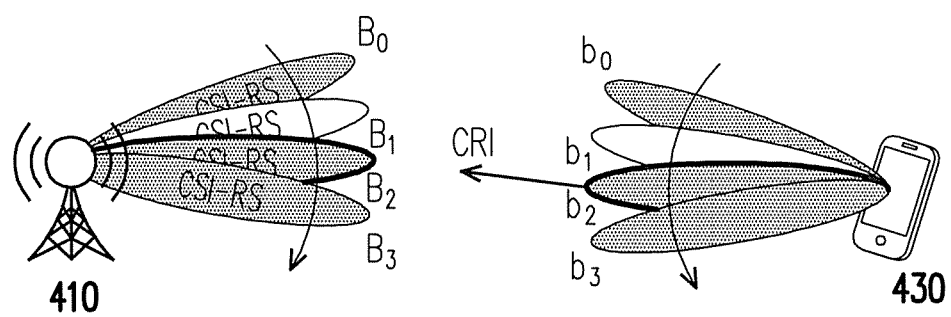
FIG. 4D illustrates an example of determining BPLs in a P2 (or P3) procedure.
Figure 5:
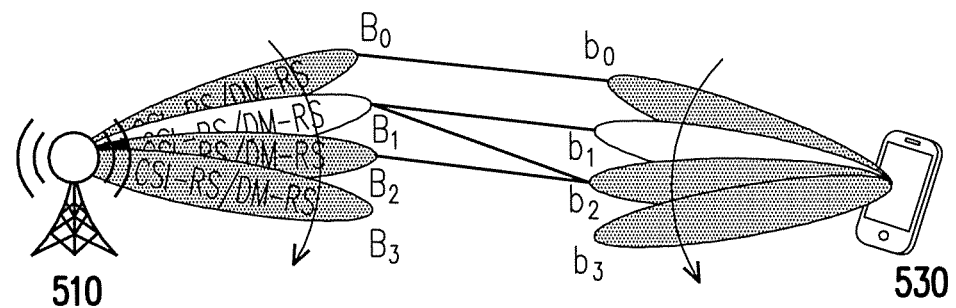
FIG. 5 illustrates an example of a DMRS port quasi-co-located with several Tx beams of a BS

Reference will now be made in detail to the present preferred embodiments of the disclosure, examples of which are illustrated in the accompanying drawings. Wherever possible, the same reference numbers are used in the drawings and the description to refer to the same or like parts.

Figure 6A:
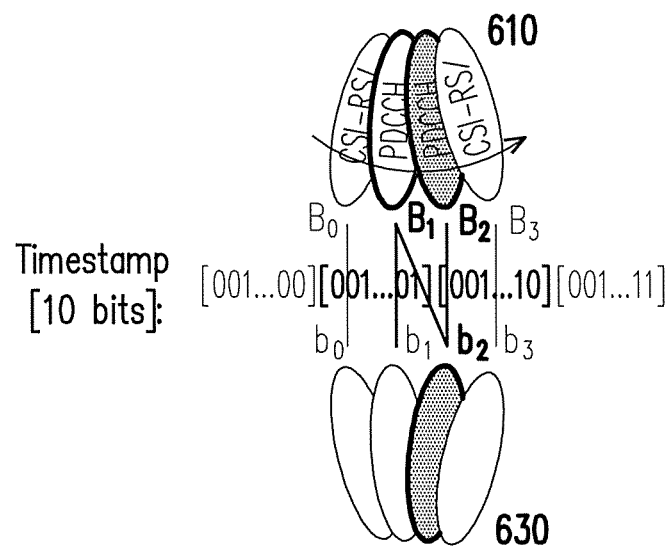
FIG. 6A illustrates an example of a beam indication scheme using absolute timestamps.
Figure 6B:
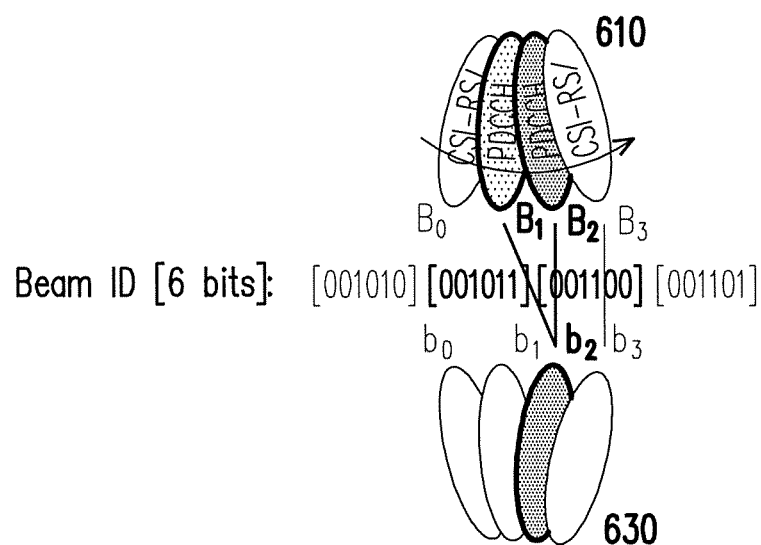
FIG. 6B illustrates an example of a beam indication scheme using unique Tx beam indexes.
Figure 6C:
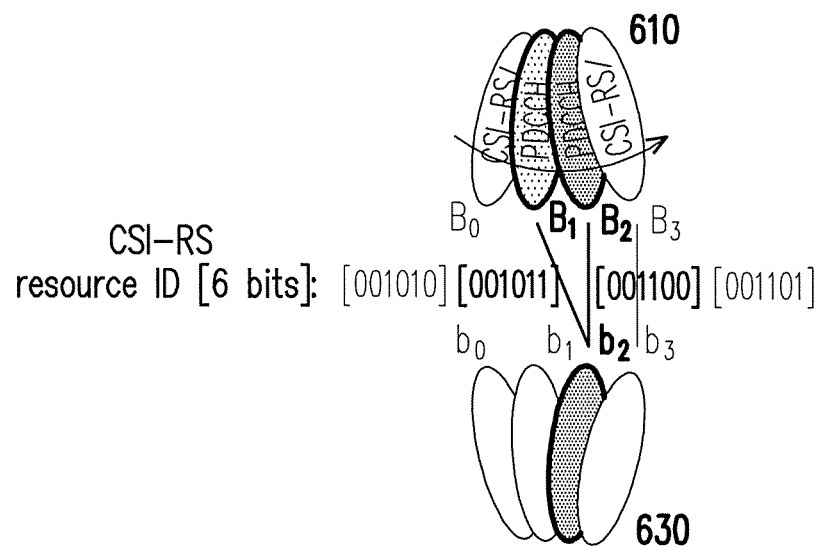
FIG. 6C illustrates an example of a beam indication scheme using CSI-RS resource indicators.
Figure 6D:
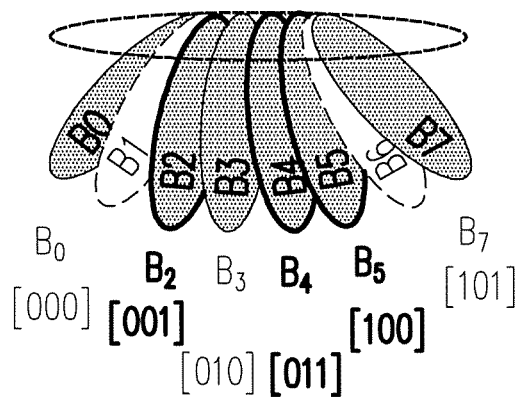
FIG. 6D illustrates an example of a beam indication scheme using measurement indicator tag.
Figure 6D:
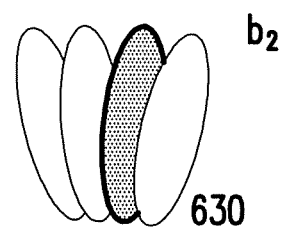
Figure 6E:
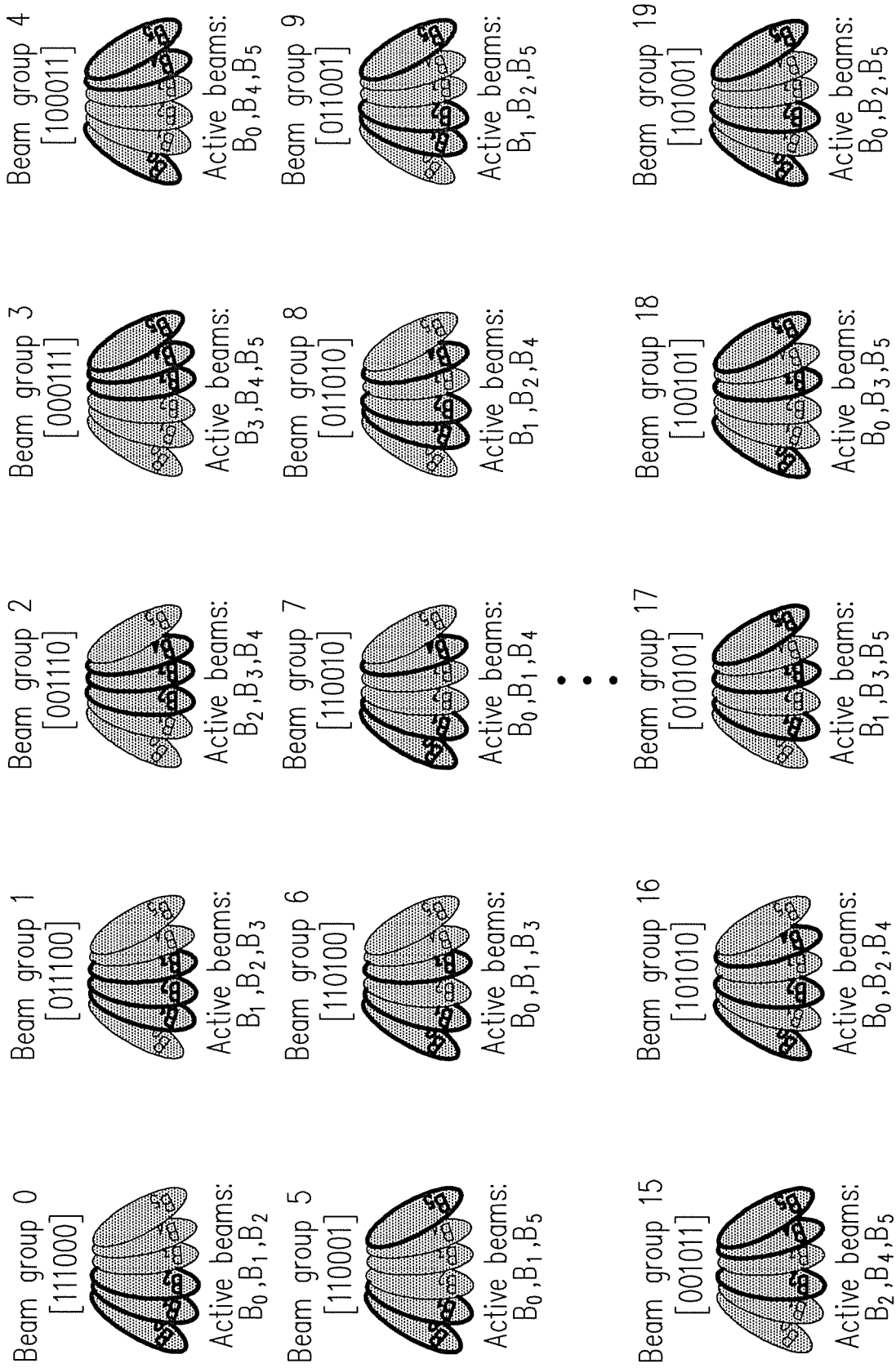
FIG. 6E illustrates an example of a beam group indication scheme using bitmap indicator.

In this disclosure, a beam indication method for a multi-beam wireless communication system and electronic device are provided. In order to indicate multi-beam, a bitmap based on beam grouping may be used, wherein each bit of a beam indicator represents an active or non-active status of the candidate beams N. FIG. 6E illustrates an example of a beam group indication scheme using bitmap indicator. For example, beam group 0 as shown in FIG. 6E can be represented by the bit stream [111000] and one bit per corresponding candidate beam, wherein the [111] of the bit stream [111000] represents the active beams (i.e. $B_0$, $B_1$, and $B_2$) and the [000] of the bit stream [111000] represents the inactive beams (i.e. $B_3$, $B_4$, and $B_5$) of beam group 0. Since there could be a large number of candidate beams in a multibeam wireless communication system, the beam group indication method mentioned in FIG. 6E may also introduce overhead in some situations.

In this disclosure, the electronic device implementing the beam indication method to generate a codebook for beam indication may be (but not limited to) a computer apparatus, a base station (BS), a user equipment (UE) or other communication entity of the multibeam wireless communication system. The electronic device may at least include a processor and a storage medium, and the processor may access the non-transitory storage medium which stores programming codes, buffered data, or record configurations assigned by the processor. Through accessing the non-transitory storage medium, the processor is configured to perform procedures of the proposed beam indication method in accordance with the proposed exemplary embodiments of the disclosure.

According to the embodiments of the disclosure, the electronic device may generate a codebook for beam indication by performing the proposed beam indication method. The electronic device in the disclosure may be a BS or a UE, and the BS or the UE may generate the codebook for beam indication on its own base on the same configuration. Alternatively, the electronic device in the disclosure, which is not a UE or a BS, may provide the generated codebook for beam indication to a BS and a UE. Hence, after obtaining and storing the code book for beam indication by the BS and the UE, the UE may know which BS beam(s) is indicated by the BS based on the codebook for beam indication provided by the electronic device.

The term BS in this disclosure could be synonymous, for example, with a variation or a sub-variation of a "gNodeB" (gNB), an "eNodeB" (eNB), a Node-B, an advanced BS (ABS), a base transceiver system (BTS), an access point, a home BS, a relay station, a scatterer, a repeater, an intermediate node, an intermediary, satellite-based communication BSs, and so forth.

The term "user equipment" (UE) in this disclosure may be, for example, a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and the like. In some applications, a UE may be a fixed computer device operating in a mobile environment, such as a bus, a train, an airplane, a boat, a car, and so forth.

Figure 7:
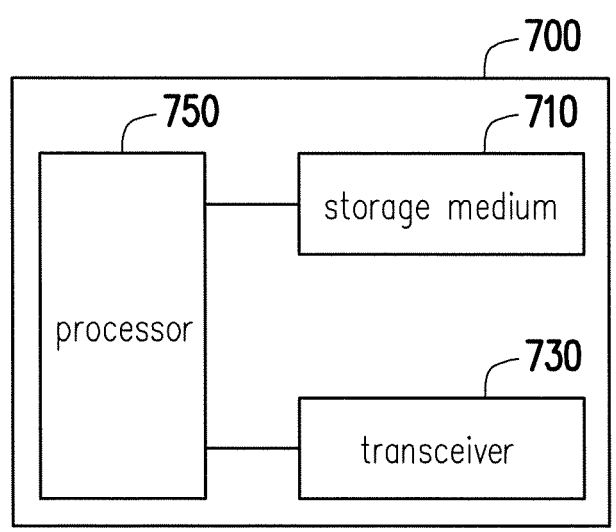
FIG. 7 is a functional block diagram of an electronic device in accordance with one of the exemplary embodiments of the disclosure.

FIG. 7 is a functional block diagram of an electronic device in accordance with one of the exemplary embodiments of the disclosure. The electronic device 700 which is a BS or a UE for example may include but not limited to a storage medium 710, a transceiver 730, and a processor 750 coupled to the storage medium 710 and the transceiver 730. The storage medium 710 provides temporary storage or permanent storage, which may be a memory for storing a programming code, a device configuration, buffer or permanent data, a codebook and the like.

The transceiver 730 is configured to transmit and receive a radio signal, which is capable of transceiving an uplink (UL) signal and/or a downlink (DL) signal in a wireless manner. The transceiver 730 may also perform operations such as low noise amplifying, impedance matching, frequency mixing, frequency upconversion or downconversion, filtering, amplification and the like. For example, the transceiver 730 may include an amplifier, a mixer, an oscillator, an analog-to-digital converter (ADC)/a digital-to-analog converter (DAC), a filter and the like. The analog-to-digital converter (ADC) is configured to convert an analog signal format into a digital signal format during an uplink signal processing period, whereas the digital-to-analog converter (DAC) converts a digital signal format into an analog signal format during a downlink signal processing period.

The processor 750 is configured to perform a beam indication method for a multibeam wireless communication system which will be described afterward. The function of the processor 750 can be implemented by using a programmable unit such as a microprocessor, a micro controller, a digital signal processing (DSP) chip, a field programmable gate array (FPGA), etc. The function of the processor 750 can also be implemented by using an integrated circuit (IC), and the processor 750 can also be implemented by hardware or software.

In the disclosure, the candidate beams may be all of the capable beams of the BS or part of capable beams of the BS, and the active beam selected after beam measurement procedures are part of the candidate beams. For example, when performed a beam alignment procedure, e.g. P1 procedure, all of the capable beams of the BS may be measured, and the candidate beams, which may be consecutive, may be all of the capable beams of the BS. After the beam measurement procedure, the active beam among the candidate beams of the BS may be determined and informed to the UE via a beam indicator by referring the codebook for beam indication. On the other hand, when performed a beam refinement procedure, e.g. P2 procedure, part of the capable beams of the BS may be measured, and the candidate beams, which may be non-consecutive, are part of the capable beams of the BS. After the beam measurement procedure, the active beam among the candidate beams of the BS may be determined and informed to the UE via a beam indicator by referring the codebook for beam indication.

Figure 8A:
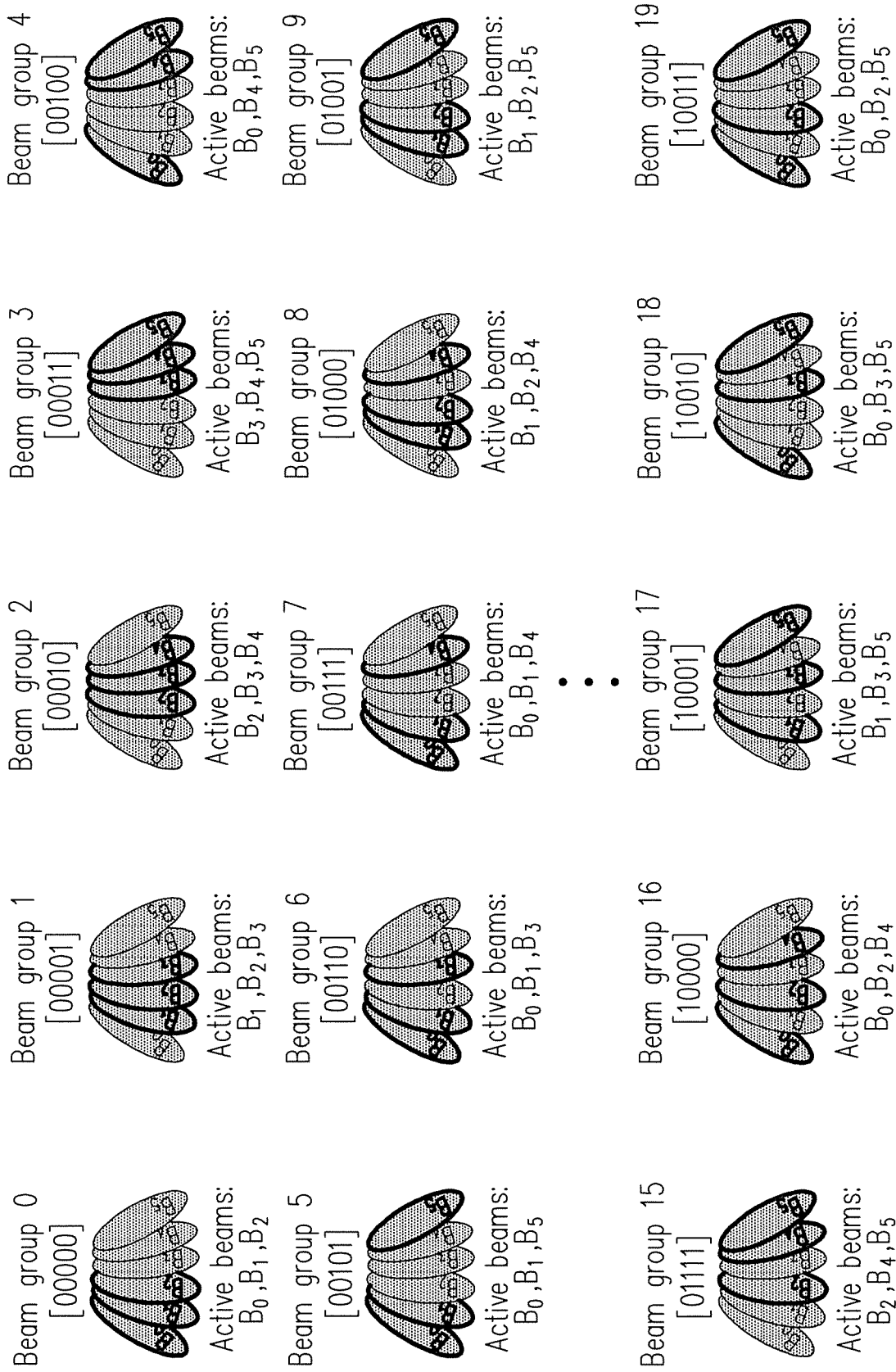
FIG. 8A illustrates a concept of beam groups indication in accordance with one of the exemplary embodiments of the disclosure.

FIG. 8A illustrates a concept of beam indication base on beam groups in accordance with one of the exemplary embodiments of the disclosure. Referring to FIG. 8A, it is assumed that the number of candidate beams $B_0$ to $B_5$ is 6 (N=6) and the number of active beams is 3 (M=3), but the disclosure is not limited thereto. The number of candidate beams $B_0$ to $B_5$ is always greater or equal to the number of active beams (N>M≥1). The beam groups 0 to 19 are selections of three active beams from six candidate beams.

Based on the number of the candidate beams and the number of the active beams, the number of the beam groups may be determined. As illustrated in FIG. 8A, the number of beam groups (i.e. beam groups 0 to beam group 19 as shown in FIG. 8A) is $$C_M^N = \frac{N!}{M!(N-M)!} = \frac{6!}{3!(6-3)!} = 20,$$

thus it would take 20 codewords to respectively represent each beam group, so as to form the codebook of the said beam groups under the condition of N=6 and M=3. Further, each of the codewords for representing each of the beam groups may be encoded to a 5-bit bit stream based on the number of the beam groups $$\left(\left\lceil \log_2 \frac{N!}{M!(N-M)!} \right\rceil = \left\lceil \log_2 \frac{6!}{3!(6-3)!} \right\rceil = 5 \text{ bits}\right).$$

For example, beam group 2 as shown in FIG. 8A can be represent by the bit stream [00010] which consists of 5 bits. That is, the number of the bits of the beam indicator for indicating multi-beam is depending on the number of the beam groups. FIG. 8A illustrates a complete codebook including 20 beam groups 0 to 19 and the corresponding beam indicators (i.e, [00000], [00001], . . . , [10011]) when M=3 and N=6. The codebook may be pre-computed or pre-stored in the memory of a UE and a BS.

Figure 9A:
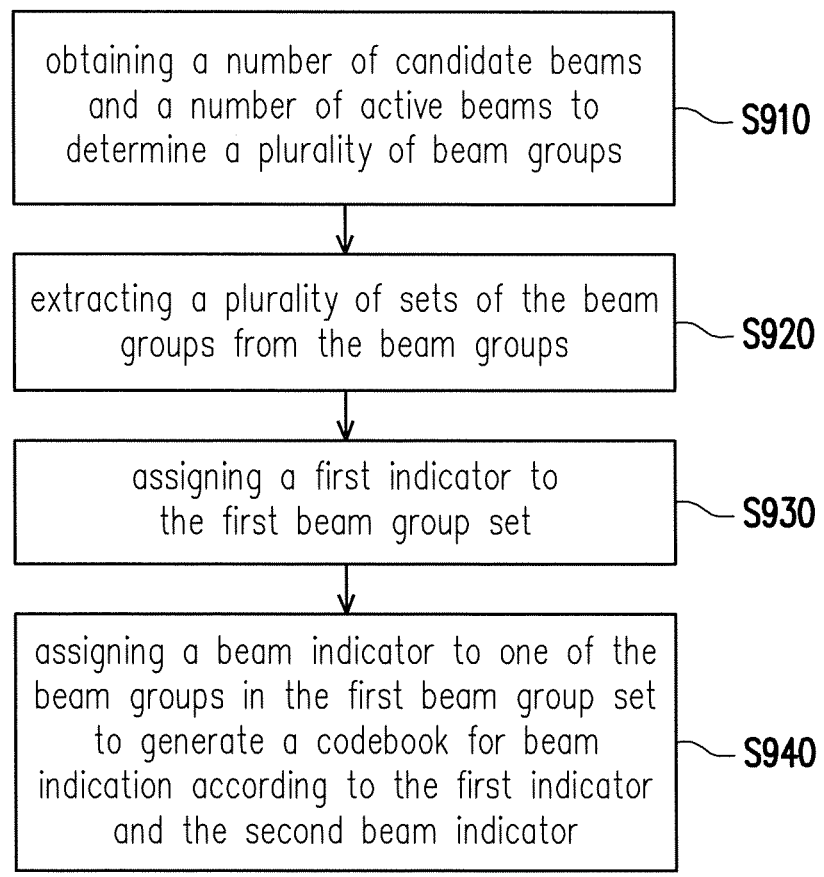
FIG. 9A illustrates a flowchart of a beam indication method adapted to an electronic device for a multibeam wireless communication system in accordance with one of the exemplary embodiments of the disclosure.

FIG. 9A illustrates a flowchart of a beam indication method adapted to an electronic device for a multibeam wireless communication system in accordance with one of the exemplary embodiments of the disclosure, wherein the electronic device could be the electronic device 700 as shown in FIG. 7.

Figure 8B:
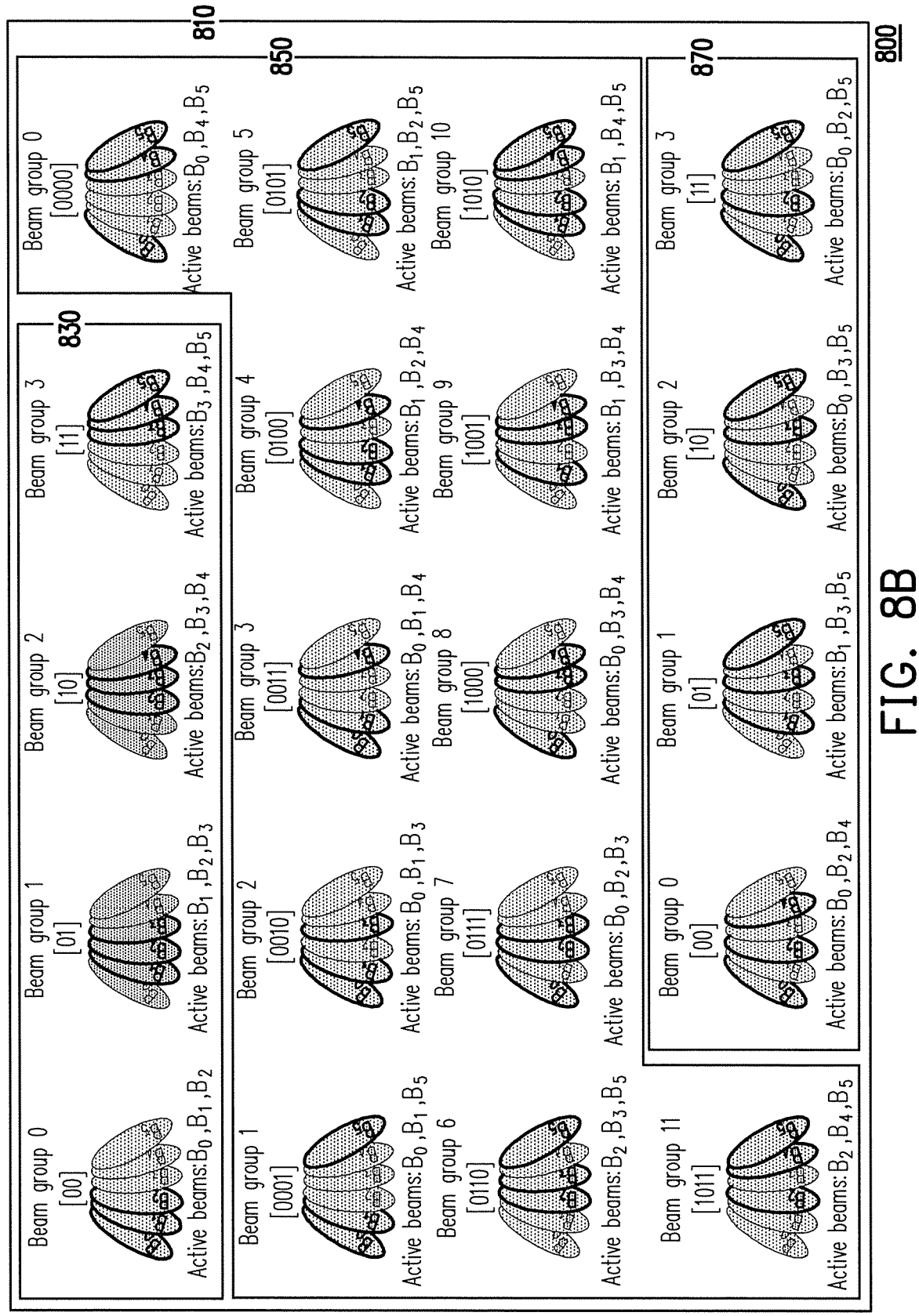
FIG. 8B illustrates a concept of beam groups indication in accordance with another one of the exemplary embodiments of the disclosure.

In step S910, the electronic device 700 may obtain a number of candidate beams N and a number of active beams M to determine a plurality of beam groups, wherein the beam groups are selections of active beams from the candidate beam. For example, referring to FIG. 8B, FIG. 8B illustrates a concept of beam groups indication in accordance with another one of the exemplary embodiments of the disclosure. In the step S910, the electronic device 700 could obtain that the number of the candidate beams is 6 (N=6) and the number of the active beams is 3 (M=3), and 20 beam groups may be determined accordingly as shown in FIG. 8B. For instance, the beam group 0 of the set 830 is a selection of the active beams $B_0$, $B_1$, and $B_2$ from the candidate beams $B_0$, $B_1$, $B_2$, $B_3$, $B_4$, and $B_5$.

In step S920, the electronic device 700 could extract a plurality of sets of the beam groups from the beam groups. For example, sets 810, 830, 850, and 870 are extracted from the beam groups as shown in FIG. 8B. In FIG. 8B, the set 810 of the beam groups is a full set of the beam groups, and the sets 830, 850, and 870 of the beam groups respectively include different parts of the beam groups. The plurality of sets of the beam groups comprise a first beam group set, which may be the sets 810, 830, 850, or 870.

In one embodiment of the disclosure, the plurality of sets of the beam groups could be extracted according to a channel property which may comprise a multipath scatting condition or mobility condition of a UE. Specifically, the plurality of sets of the beam groups may be extracted from the beam groups based on beam consecutive level of the active beams, as the channel property is the multipath scatting condition. The plurality of sets of the beam groups may be extracted based on beam overlap level of the active beams, as the channel property is the mobility condition of the UE. In FIG. 8B, the sets 830, 850, and 870 of the beam groups are extracted from the beam groups based on beam consecutive level of the active beams, as considering the channel property is the multipath scatting condition. The sets 830, 850, and 870 may respectively include the different beam groups. Through extracting the sets based on the beam consecutive level of the active beams, all of the active beams in the beam group 0 to 3 of the sets 830 are consecutive, part of the active beams in the beam group 0 to 11 of the sets 850 are consecutive, and all of the active beams in the beam group 0 to 3 of the sets 870 are non-consecutive. For example, the beam group 0 of the beam group set 870 comprises non-consecutive active beams $B_0$, $B_2$, and $B_4$. The beam group 0 of the beam group set 830 comprises consecutive active beams $B_0$, $B_1$, and $B_2$. Therefore, the beam group set 830 with highly consecutive level is more suitable than the beam group set 870 when the transmission channel has higher carrier frequency. On the contrary, the beam group set 870 with low consecutive level is more suitable than the beam group set 830 when the transmission channel has lower carrier frequency.

In step S930, the electronic device 700 could assign a first indicator $\alpha$ to the first beam group set, wherein the first indicator $\alpha$ is referred as a subset selection indicator. Namely, the electronic device 700 may assigned a first indicator $\alpha$ to each of the plurality of sets of the beam groups. For example, the first indicator $\alpha=0$ may be assigned to the set 810; the first indicator $\alpha=1$ may be assigned to the set 830; the first indicator $\alpha=2$ may be assigned to the set 850; and the first indicator $\alpha=3$ may be assigned to the set 870. Accordingly, a BS could transmit the first indicator $\alpha$ to a UE to inform the UE which set of beam groups is currently be chosen. It should be note that, the number of bits of the first indicator $\alpha$ is $\lceil \log_2 K_{0,0} \rceil$, wherein $K_{0,0}$ is the number of the plurality of sets of the beam groups. In FIG. 8B, since $K_{0,0}$ is 4, the number of bits of the first indicator $\alpha$ is 2 and the bit stream of first indicator $\alpha$ of the sets 810, 830, 850, 870 may be [00] ($\alpha=0$), [01] ($\alpha=1$), [10] ($\alpha=2$), [11] ($\alpha=3$).

In step S940, the electronic device 700 could assign a beam indicator ha to one of the beam groups in the first beam group set to generate a codebook for beam indication according to the first indicator and the beam indicator, wherein $\alpha$ is the first indicator. For example, the electronic device 700 could assign a beam indicator h, (i.e. [00] as shown in FIG. 8B) to the beam group 0 of the first beam group set 830. Accordingly, a BS could transmit the beam indicator ha (i.e. [00] as shown in FIG. 8B) to a UE to inform the UE that the beam group 0 of the first beam group set 830 is currently be chosen, and the active beams $B_0$, $B_1$, and $B_2$ selected by the BS could be understood by the UE.

By performing each of the steps in FIG. 9A, a codebook including a plurality of beam indicators and a plurality of first indicator $\alpha$ for representing every beam groups may be formed under the condition of M=3, N=6 and $K_{0,0}=4$. Since the set 830 includes 4 beam groups, the 2-bit bit beam indicator [00], [01], [10] and [11] are respectively assigned to the beam groups 0 to 3 in the set 830. Since the set 870 includes 4 beam groups, the 2-bit bit beam indicator [00], [01], [10] and [11] are respectively assigned to the beam groups 0 to 3 in the set 870. Since the set 850 includes 12 beam groups, the 4-bit bit beam indicator [0000], [0001], [0010], . . . , [1011] are respectively assigned to the beam groups 0 to 11 in the set 850. That is, the BS may inform the UE which active beams are selected by using the first indicator and the beam indicator, and the UE may use the first indicator and the beam indicator received from the BS to know which active beams are indicated by the BS. For example, when the UE receive a first indicator $\alpha=1$ and the beam indicator [00], the UE is able to know that the active beams $B_0$, $B_1$, $B_2$ are indicated by the BS. However, FIG. 8B is merely one exemplary for explaining the codebook design manner of the proposed method, the disclosure is not limited thereto.

Figure 9B:
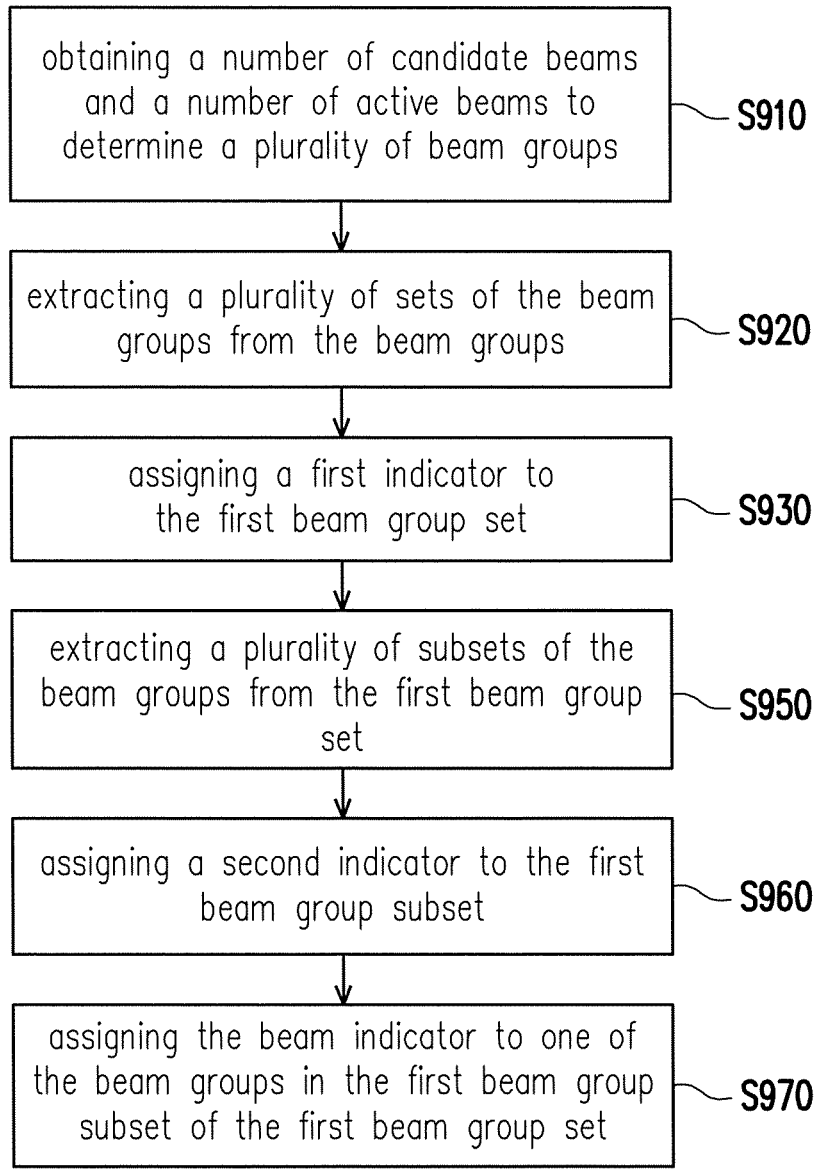
FIG. 9B illustrates a flowchart of further details of the method disclosed in FIG. 9A in accordance with one of the exemplary embodiments of the disclosure.

In one embodiment of the disclosure, the plurality of sets of the beam groups may be further partitioned into some subsets, a second indicator may be used for representing each subset of one of the plurality of sets, and the beam indicator may be assigned according to the number of the beam groups in each subset. FIG. 9B illustrates a flowchart of a beam indication method adapted to an electronic device for a multibeam wireless communication system in accordance with one of the exemplary embodiments of the disclosure, wherein the electronic device could be the electronic device 700 as shown in FIG. 7.

Figure 8C:
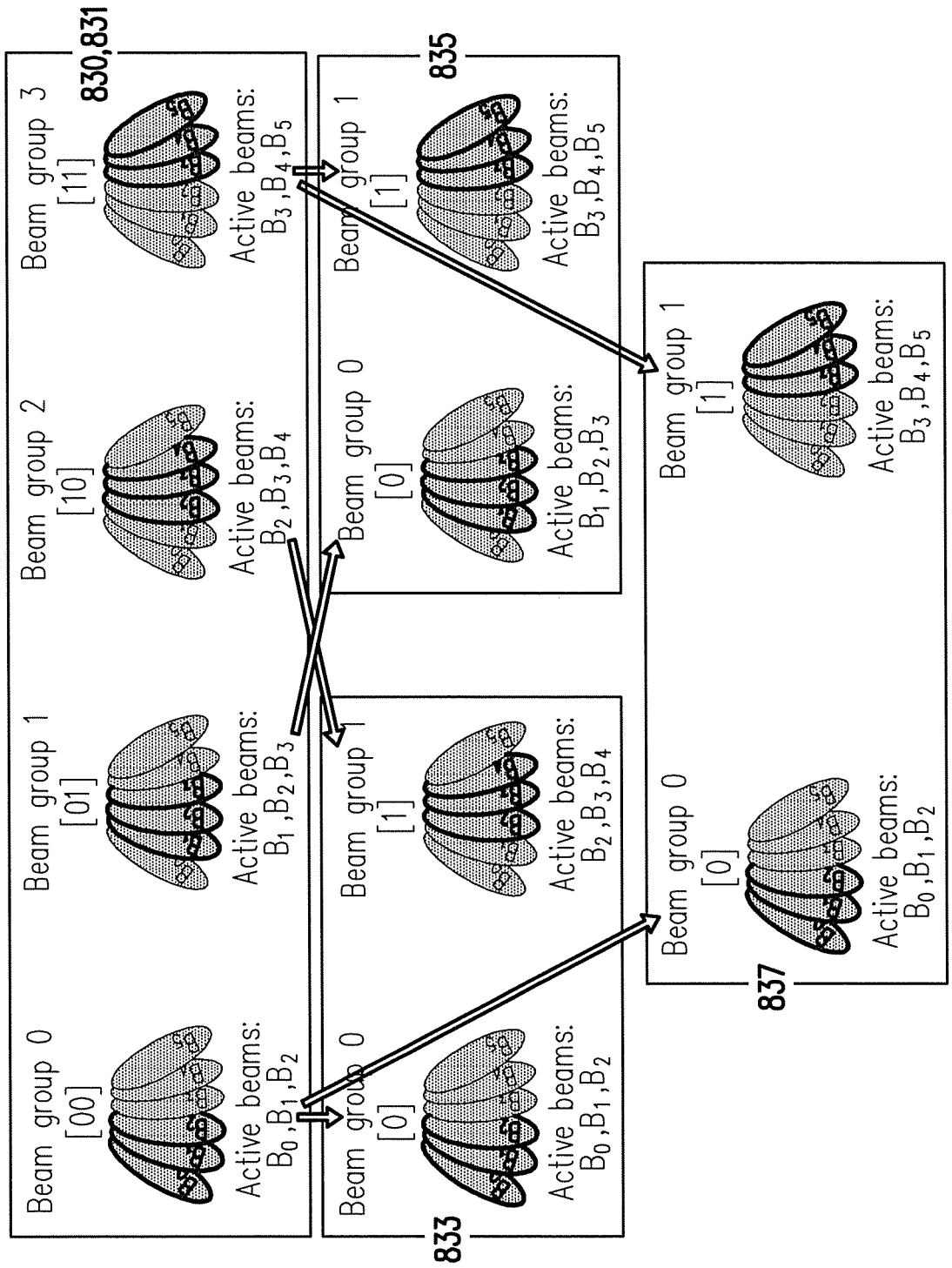
FIG. 8C illustrates a concept of beam groups indication in accordance with another one of the exemplary embodiments of the disclosure.

In step S910, the electronic device 700 could obtain a number of candidate beams N and a number of active beams M to determine a plurality of beam groups, wherein the beam groups are selections of active beams from the candidate beam. In step S920, the electronic device 700 could extract a plurality of sets s of the beam groups from the beam groups. In step S930, the electronic device 700 could assign a first indicator $\alpha$ to the first beam group set, wherein the first indicator $\alpha$ is referred as a subset selection indicator. After the step S930, step S950 is performed. In step S950, the electronic device 700 could extract a plurality of subsets of the beam groups from the first beam group set, wherein the plurality of subsets of the beam groups include a first beam group subset. For example, referring to FIG. 8C, FIG. 8C illustrates a concept of beam groups indication in accordance with another one of the exemplary embodiments of the disclosure. For ease of explanation, the first beam group set is assumed to be beam group set 830 in FIG. 8B hereinafter. In step S950, the electronic device 700 could extract a plurality of subsets 831, 833, 835, and 837 of the beam groups from the first beam group set 830, wherein the plurality of subsets of the beam groups comprise a first beam group subset which may be subsets 831, 833, 835, or 837, as shown in FIG. 8C.

The subsets 831, 833, 835, and 837 of the beam groups could be extracted according to a channel property which may comprise mobility condition of a UE. In one exemplary embodiment, the plurality of subsets of the beam groups are extracted based on beam overlap level of the active beams, as the channel property is the mobility condition of the UE. In FIG. 8C, the subsets 831, 833, 835, and 837 of the beam groups are extracted from the first beam group set 830 based on beam overlap level J of the active beams, wherein $0 \leq J \leq M-1$.

Herein, the beam overlap level J is defined as the number of the active beams overlapped within the two beam groups in one subset. For example, when J=2, the beam group subset 831 could be extracted and comprises four beam groups 0, 1, 2, and 3. When J=2, the active beams of each of the four beam groups 0, 1, 2, and 3 is overlapped with the active beams of another adjacent beam group in the beam group subset 831 by 2 beams (i.e. beam group 0 is overlapped with adjacent beam group 1 by 2 active beams $B_1$ and $B_2$, beam group 1 is overlapped with adjacent beam group 2 by 2 active beams $B_2$ and $B_3$, and so on). Similarly, the beam overlap level J of the subsets 833 and 835 of the beam groups could be defined as 1, and the beam overlap level J of the subsets 837 of the beam groups could be defined as 0. The selection of the subset with the beam overlap level J could be performed based on channel property such as UE's mobility condition. That is, when moving speed of a UE is fast, a BS may choose a beam group subset with a smaller J from the beam group set 830 (e.g. beam group subset 837 with J=0) for beam indication. On the contrary, when moving speed of a UE is slow, the BS may choose a beam group subset with a larger J from the beam group subset 831 (e.g. beam group subset 831 with J=2) for beam indication.

In step S960, the electronic device 700 could assign a second indicator β to the first beam group subset, which may be subsets 831, 833, 835 and 837. The second indicator β is referred as another subset selection indicator. Namely, the electronic device 700 may assigned the second indicator β to each of the plurality of subsets of the beam groups. For example, the second indicator β=0 may be assigned to the subset 831; the second indicator β=1 may be assigned to the subset 833; the second indicator β=2 may be assigned to the subset 835; and the second indicator β=3 may be assigned to the subset 837. Accordingly, a BS could transmit the second indicator β to a UE to inform the UE that the first beam group subset 837 of the first group set 830 is currently be selected. The first indicator α and the second indicator β could be set to the UE by the BS, thus the BS and the UE can reach a common understanding on which subset of the beam groups is selected by the US. It should be note that, the number of bits of the second indicator is $\lceil \log_2 K_{1,0} \rceil$, wherein $K_{1,0}$ is the number of the plurality of subsets of the beam groups. In FIG. 8C, since $K_{1,0}$ is 4, the number of bits of the second indicator β is 2 and the bit stream of second indicator β of the subsets 831, 833, 835, 837 may be [00] (β=0), [01] (β=1), [10] (β=2), [11] (β=3).

After that, in step S970, the electronic device 700 could assign the beam indicator $h_{\alpha,\beta}$ to one of the beam groups in the first beam group subset of the first beam group set, wherein α is the first indicator and is β the second indicator. The number of bits of the beam indicator $h_{\alpha,\beta}$ is $\lceil \log_2 H_{\alpha,\beta} \rceil$, wherein $H_{\alpha,\beta}$ is the number of the beam groups in the first beam group subset of the first beam group set. For example, the electronic device 700 could assign a beam indicator $h_{\alpha,\beta}$ (i.e. [0] as shown in FIG. 8C) to beam group 0 in the first beam group subset 837 having $H_{\alpha,\beta}$=2 beam groups. Accordingly, when the BS wants to inform the UE which active beams has been chosen, the BS could transmit the beam indicator $h_{\alpha,\beta}$ (i.e. [0] as shown in FIG. 8C) to a UE to inform the UE that the beam group 0 in the first beam group subset 837 of the first beam group set 830 is currently be indicated for communication between the BS and the UE. Since the first beam group subset 837 is configured to contain merely 2 beam groups, it would take only 1 bit for transmitting the beam indicator $h_{\alpha,\beta}$.

By performing each of the steps in FIG. 9B, a codebook including a plurality of beam indicators, a plurality of second indicator β and a plurality of first indicator α for representing every beam groups may be formed under the condition of M=3, N=6, $K_{0,0}$=4 and $K_{1,0}$=4. In FIG. 8C, since the subset 831 includes 4 beam groups, the 2-bit bit beam indicator [00], [01], [10] and [11] are respectively assigned to the beam groups 0 to 3 in the set 831. For example, when α=1 and β=0, the beam indicator [00] may be used for indicating the active beams $B_0$, $B_1$ and $B_2$. Since the set 833 includes 2 beam groups, the 1-bit bit beam indicator [0] and [1] are respectively assigned to the beam groups 0 to 1 in the set 833. For example, when α=1 and β=1, the beam indicator [1] may be used for indicating the active beams $B_2$, $B_3$ and $B_4$. Since the set 835 includes 2 beam groups, the 1-bit bit beam indicator [0] and [1] are respectively assigned to the beam groups 0 to 1 in the set 835. Since the set 837 includes 2 beam groups, the 1-bit bit beam indicator [0] and [1] are respectively assigned to the beam groups 0 to 1 in the set 837. For example, when α=1 and β=3, the beam indicator [1] may be used for indicating the active beams $B_3$, $B_4$ and $B_5$. That is, the BS may inform the UE which active beams are selected by using the first indicator, the second indicator and the beam indicator, and the UE may use the first indicator, the second indicator and the beam indicator received from the BS to know which active beams are indicated by the BS. For example, when the UE receive a first indicator α=1, a second indicator β=3 and the beam indicator [0], the UE is able to know that the active beams $B_0$, $B_1$, $B_2$ are indicated by the BS. However, FIG. 8C is merely one exemplary for explaining the codebook design manner of the proposed method, the disclosure is not limited thereto.

In one exemplary embodiment, the first indicator α and the second indicator β can be transmitted/received by the BS and the UE via a L3 signaling and/or a L2 signaling which can be, for example, a radio resource control (RRC) message (i.e. L3 signaling) and/or a medium access control (MAC) control element (CE) (i.e. L2 signaling). Furthermore, the beam indicator may be transmitted/received via L1 signaling or L2 signaling, for example, a DCI (i.e. L1 signaling) or a MAC-CE (i.e. L2 signaling). In one exemplary embodiment, in addition to the first indicator α and the second indicator β, another 1-bit indicator could be transmitted from a BS to a UE before transmitting the first indicator α and the second indicator β alternatively. The 1-bit indicator may be utilized to inform the UE that the beam indication method of the disclosure is currently in used and the UE should prepare to receive the first indicator α and the second indicator β for performing the beam group indication.

Figure 10:
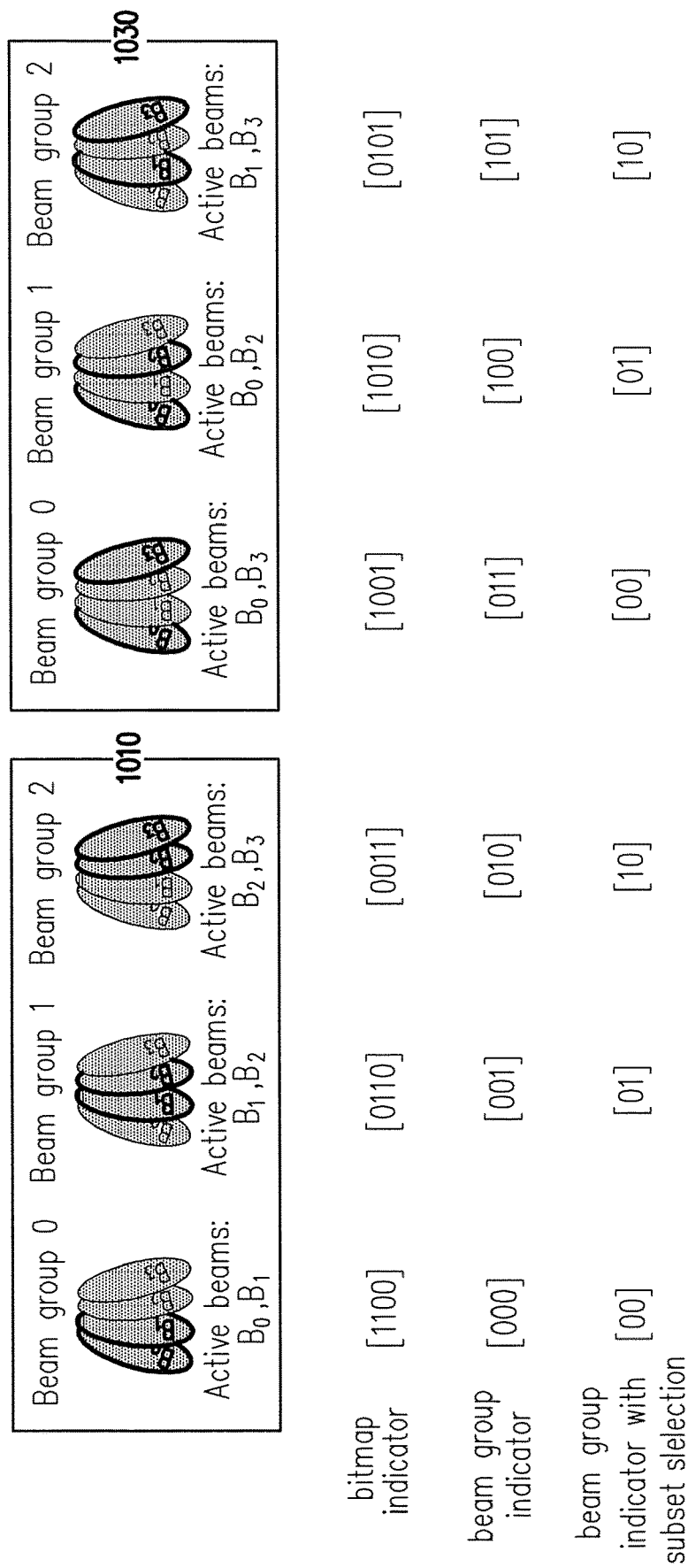
FIG. 10 illustrates an example of beam group indication in accordance with one of the exemplary embodiments of the disclosure.

Here is an example of M=2 and N=4. FIG. 10 illustrates an example of beam group indication in accordance with one of the exemplary embodiments of the disclosure. It is assumed that the number of candidate beams is 4 and the number of active beams is 2, thus the total number of available beam groups is $$\frac{N!}{M!(N-M)!} = \frac{4!}{2!(4-2)!} = 6$$

as shown in FIG. 10.

By using the beam indication manner shown in FIG. 6E, a selected beam group of the beam groups as shown in FIG. 10 can be indicated by a bitmap indicator. Each bit of the bitmap indicator may represent active status for each beam of the selected beam group. For example, if the active beams $B_0$ and $B_1$ are selected by the BS, the 4-bit bitmap indicator [1100] could be transmitted to the UE, wherein the [11] part of the bit stream [1100] represent active beams $B_0$ and $B_1$ and the [00] part of the bit stream [1100] represent beams $B_2$ and $B_3$. The bitmap indicator [1100] can be transmitted/received via an L1 signaling or L2 signaling which is, for example, DCI (i.e. L1 signaling) or a MAC-CE (i.e. L2 signaling).

In one exemplary embodiment, the two selected active beams can be indicated by using a beam indication manner in accordance with one of the exemplary embodiments of FIG. 8A. Specifically, each beam group as shown in FIG. 10 would be associated with a unique codeword (i.e. beam indicator), and each of the codewords would be represented as a bit stream of $\lceil \log_2 C_2^4 \rceil = \lceil \log_2 6 \rceil = 3$ bits. For example, if the active beams $B_0$ and $B_1$ are selected by the BS, the 3-bit beam indicator [000] could be transmitted to the UE. The beam indicator of 3 bits can be transmitted/received via an L1 signaling or L2 signaling which is, for example, a DCI (i.e. L1 signaling) or a MAC-CE (i.e. L2 signaling).

Moreover, when using the same beam indication manner as shown in FIG. 8B, the sets 1010, 1030 of the six beam groups may be extracted, and the sets 1010, 1030 are respectively corresponding to the different first indicators, such as [0] and [1]. Such that, the beam indicator $h_{\alpha,\beta}$ can be represented as a bit stream of $\lceil \log_2 H_{\alpha,\beta} \rceil = \lceil \log_2 3 \rceil = 2$ bits, wherein $H_{\alpha,\beta}$ is the number of beam groups of the beam group sets 1010, 1030. Namely, the different beam indicators of 2 bits could be respectively corresponding to the beam groups in the plurality of sets of the beam groups. The beam indicator $h_{\alpha,\beta}$ could be transmitted/received via an L1 signaling or an L2 signaling which can be, for example, downlink control information. Hence, when the BS wants to indicate some active beams to the UE, if the active beams $B_0$ and $B_1$ are selected by the BS, the 2-bit beam indicator [00] could be transmitted to the UE via an L1 signaling or an L2 signaling, and the first indicator α would be transmitted to the UE via L3 signaling or L2 signaling.

In one of the exemplary embodiments of the disclosure, Table 1 shows a comparison between a bitmap indicator and a beam indicator $h_{\alpha,\beta}$ in the case of the number of candidate beams is 3 (N=3) and the number of active beams is 2 (M=2), wherein $K_{0,0}$ is the number of the plurality of sets of the beam groups of the codebook associated with N and M, $K_{1,0}$ is the number of subsets of the beam groups of the beam group set, and $H_{\alpha,\beta}$ is the number of beam groups of the beam group subset.

TABLE 1

| Active beam index | beam indicator $h_{\alpha,\beta}$ | bitmap indicator |
|---|---|---|
| beam group set 1 ($K_{0,0} = 3$, $K_{1,0} = 1$, $H_{\alpha=1,\beta=0} = 2$) | | |
| $B_0$, $B_1$ | [0] | [1 1 0] |
| $B_1$, $B_2$ | [1] | [0 1 1] |
| beam group set 2 ($K_{0,0} = 3$, $K_{1,0} = 1$, $H_{\alpha=2,\beta=0} = 1$) | | |
| $B_0$, $B_2$ | [0] | [1 0 1] |
| beam group set 0 ($K_{0,0} = 3$, $K_{1,0} = 1$, $H_{\alpha=0,\beta=0} = 3$) | | |
| $B_0$, $B_1$ | [00] | [1 1 0] |
| $B_1$, $B_2$ | [01] | [0 1 1] |
| $B_0$, $B_2$ | [10] | [1 0 1] |

As shown in Table 1, since the number of the candidate beams N=3, the bitmap indicator would cost at least 3 bits for indication. However, if the beam group set currently in used remains as the beam group set 1 as shown in Table 1, it would take only 1 bit for indication of one of the plurality of sets of the beam groups (i.e. [$B_0$, $B_1$] or [$B_1$, $B_2$]) associated with N=3 and M=2. On the other hand, if the beam group set currently in used remains as the beam group set 2 as shown in Table 1, it would take only 1 bit for indication of the beam group set (i.e. [$B_0$, $B_2$]) of the codebook associated with N=3 and M=2. A beam group set could be a full set of the beam groups which comprises all of the selections of the M active beams from the N candidate beams. For example, the beam group set 0 in Table 1 comprise all of the selections of 2 active beams (M=2) from the 3 candidate beams (N=3), therefore the beam group set 3 in Table 1 comprises 3 beam groups $$\left( \frac{N!}{M!(N-M)!} = \frac{3!}{2!(3-2)!} = 3 \right).$$

Although Table 1 merely extracts 3 sets of the beam groups including the full set of the beam groups, but the number of set of the beam groups is not limited in the disclosure.

Similarly, Table 2 shows another example of a comparison between a bitmap indicator and a beam indicator $h_{\alpha,\beta}$ in the case of the number of candidate beams N is 5 and the number of active beams M is 3, wherein $K_{0,0}$ is the number of the plurality of sets of the beam groups of the codebook associated with N and M, $K_{1,0}$ is the number of subsets of the beam groups of the beam group set, and $H_{\alpha,\beta}$ is the number of beam groups of the beam group subset. However, Table 2 merely shows part of the possible sets of the beam groups and part of the possible subsets of the beam groups.

TABLE 2

| Active beam index | beam indicator $h_{\alpha,\beta}$ | bitmap indicator |
|---|---|---|
| beam group set 1: beam group subset 1 ($K_{0,0} = 4$, $K_{1,0} = 2$, $H_{\alpha=1,\beta=0} = 3$) | | |
| $B_0$, $B_1$, $B_2$ | [0 0] | [1 1 1 0 0] |
| $B_1$, $B_2$, $B_3$ | [0 1] | [0 1 1 1 0] |
| $B_2$, $B_3$, $B_4$ | [1 0] | [0 0 1 1 1] |
| beam group set 1: beam group subset 2 ($K_{0,0} = 4$, $K_{1,0} = 2$, $H_{\alpha=1,\beta=1} = 2$) | | |
| $B_0$, $B_1$, $B_2$ | [0] | [1 1 1 0 0] |
| $B_2$, $B_3$, $B_4$ | [1] | [0 0 1 1 1] |
| beam group set 2 ($K_{0,0} = 4$, $K_{1,0} = 1$, $H_{\alpha=2,\beta=0} = 6$) | | |
| $B_0$, $B_3$, $B_4$ | [0 0 0] | [1 0 0 1 1] |
| $B_0$, $B_1$, $B_4$ | [0 0 1] | [1 1 0 0 1] |
| $B_0$, $B_1$, $B_3$ | [0 1 0] | [1 1 0 1 0] |
| $B_1$, $B_2$, $B_4$ | [0 1 1] | [0 1 1 0 1] |
| $B_0$, $B_2$, $B_3$ | [1 0 0] | [1 0 1 1 0] |
| $B_1$, $B_3$, $B_4$ | [1 0 1] | [0 1 0 1 1] |
| beam group set 3 ($K_{0,0} = 4$, $K_{1,0} = 1$, $H_{\alpha=3,\beta=0} = 1$) | | |
| $B_0$, $B_2$, $B_4$ | [0] | [1 0 1 0 1] |

Similarly, Table 3 shows another example of a comparison between a bitmap indicator and a beam indicator $h_{\alpha,\beta}$ in the case of the number of candidate beams N is 6 and the number of active beams M is 2, wherein $K_{0,0}$ is the number of the plurality of sets of the beam groups of the codebook associated with N and M, $K_{1,0}$ is the number of subsets of the beam groups of the beam group set, and $H_{\alpha,\beta}$ is the number of beam groups of the beam group subset. However, Table 3 merely shows part of the possible sets of the beam groups and part of the possible subsets of the beam groups.

TABLE 3

| Active beam index | beam indicator $h_{\alpha,\beta}$ | bitmap indicator |
|---|---|---|
| beam group set 1: beam group subset 0 ($K_{0,0} = 3$, $K_{1,0} = 3$, $H_{\alpha=1,\beta=0} = 5$) | | |
| $B_0$, $B_1$ | [0 0 0] | [1 1 0 0 0 0] |
| $B_1$, $B_2$ | [0 0 1] | [0 1 1 0 0 0] |
| $B_2$, $B_3$ | [0 1 0] | [0 0 1 1 0 0] |
| $B_3$, $B_4$ | [0 1 1] | [0 0 0 1 1 0] |
| $B_4$, $B_5$ | [1 0 0] | [0 0 0 0 1 1] |

TABLE 3-continued

| Active beam index | beam indicator $h_{\alpha,\beta}$ | bitmap indicator |
|---|---|---|
| beam group set 1: beam group subset 1 ($K_{0,0} = 3$, $K_{1,0} = 3$, $H_{\alpha-1, \beta-1} = 3$) | | |
| $B_0$, $B_1$ | [0 0] | [1 1 0 0 0 0] |
| $B_2$, $B_3$ | [0 1] | [0 0 1 1 0 0] |
| $B_4$, $B_5$ | [1 0] | [0 0 0 0 1 1] |
| beam group set 1: beam group subset 2 ($K_{0,0} = 3$, $K_{1,0} = 3$, $H_{\alpha-1, \beta-2} = 2$) | | |
| $B_1$, $B_2$ | [0] | [0 1 1 0 0 0] |
| $B_3$, $B_4$ | [1] | [0 0 0 1 1 0] |
| beam group set 2 ($K_{0,0} = 3$, $K_{1,0} = 1$, $H_{\alpha-2, \beta-0} = 10$) | | |
| $B_0$, $B_5$ | [0 0 0 0] | [1 0 0 0 0 1] |
| $B_0$, $B_2$ | [0 0 0 1] | [1 0 1 0 0 0] |
| $B_1$, $B_3$ | [0 0 1 0] | [0 1 0 1 0 0] |
| $B_2$, $B_4$ | [0 0 1 1] | [0 0 1 0 1 0] |
| $B_3$, $B_5$ | [0 1 0 0] | [0 0 0 1 0 1] |
| $B_0$, $B_4$ | [0 1 0 1] | [1 0 0 0 1 0] |
| $B_2$, $B_5$ | [0 1 1 0] | [0 0 1 0 0 1] |
| $B_0$, $B_3$ | [0 1 1 1] | [1 0 0 1 0 0] |
| $B_1$, $B_4$ | [1 0 0 0] | [0 1 0 0 1 0] |
| $B_1$, $B_5$ | [1 0 0 1] | [0 1 0 0 0 1] |

Figure 11:
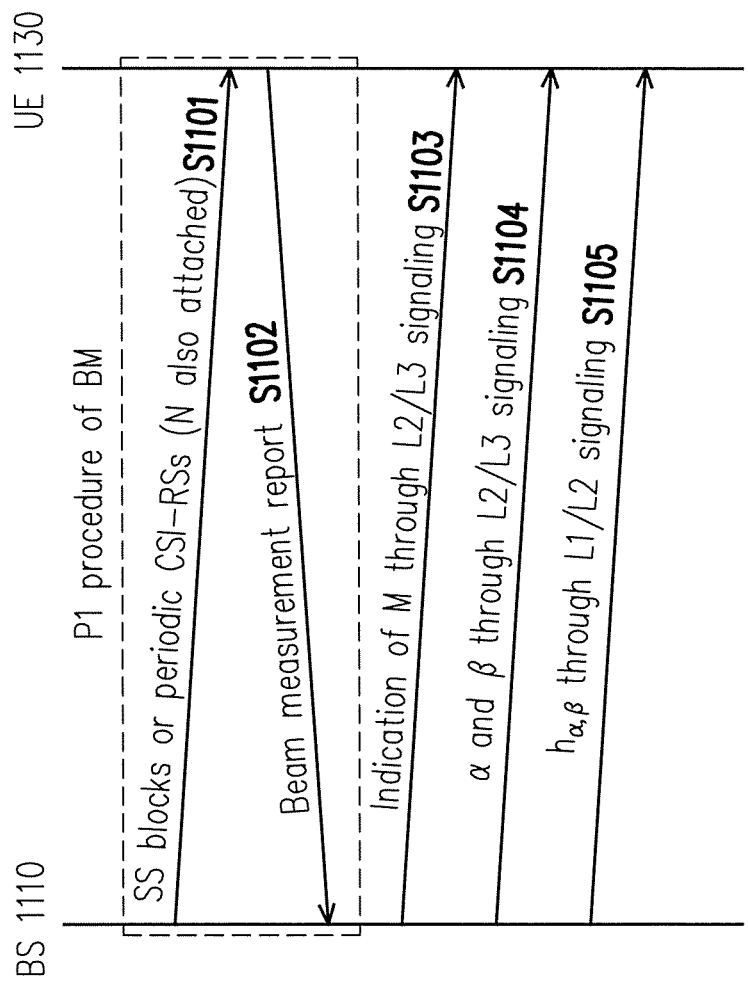
FIG. 11 illustrates a multibeam indication procedure after P procedure and before P2 procedure in accordance with one of the exemplary embodiments of the disclosure.

FIG. 11 illustrates a multibeam codeword indication procedure after P1 procedure and before P2 procedure in accordance with one of the exemplary embodiments of the disclosure. In FIG. 11, P1 procedure of downlink beam management procedures may include but not limited to steps S1101 and S1102. In step S1101, the BS 1110 may transmit synchronization signal blocks (SS blocks) or periodic CSI-RSs to the UE 1130, wherein the SS blocks or the periodic CSI-RSs may comprise information of the number of candidate beams N for the BS 1110 and the UE 1130. The BS 1110 and the UE 1130 can be electronic devices which perform the disclosed method mentioned above. In response to receiving the SS blocks or the periodic CSI-RSs from the BS 1110, in step S1102, the UE 1130 may transmit a beam measurement report to the BS 1110.

After the P1 procedure of downlink beam management procedures, the BS 1110 may determine the number of the active beams M based on the beam measurement report received from the UE 1130 in step S1103. The number of the candidate beams N and the number of the active beams M are known to both the BS 1110 and the UE 1130 after step S1103 is finished. Therefore, in step S1104, the BS 1110 may transmit a first indicator α and a second indicator β via an L2 signaling and/or an L3 signaling, wherein the first indicator α and the second indicator β may assist the UE 1130 to select a beam group subset to be used. Since the beam group subset to be used is determined, in step S1105, the BS 1110 may transmit a beam indicator $h_{\alpha,\beta}$ via an L1 signaling or an L2 signaling to the UE 1130.

Figure 12:
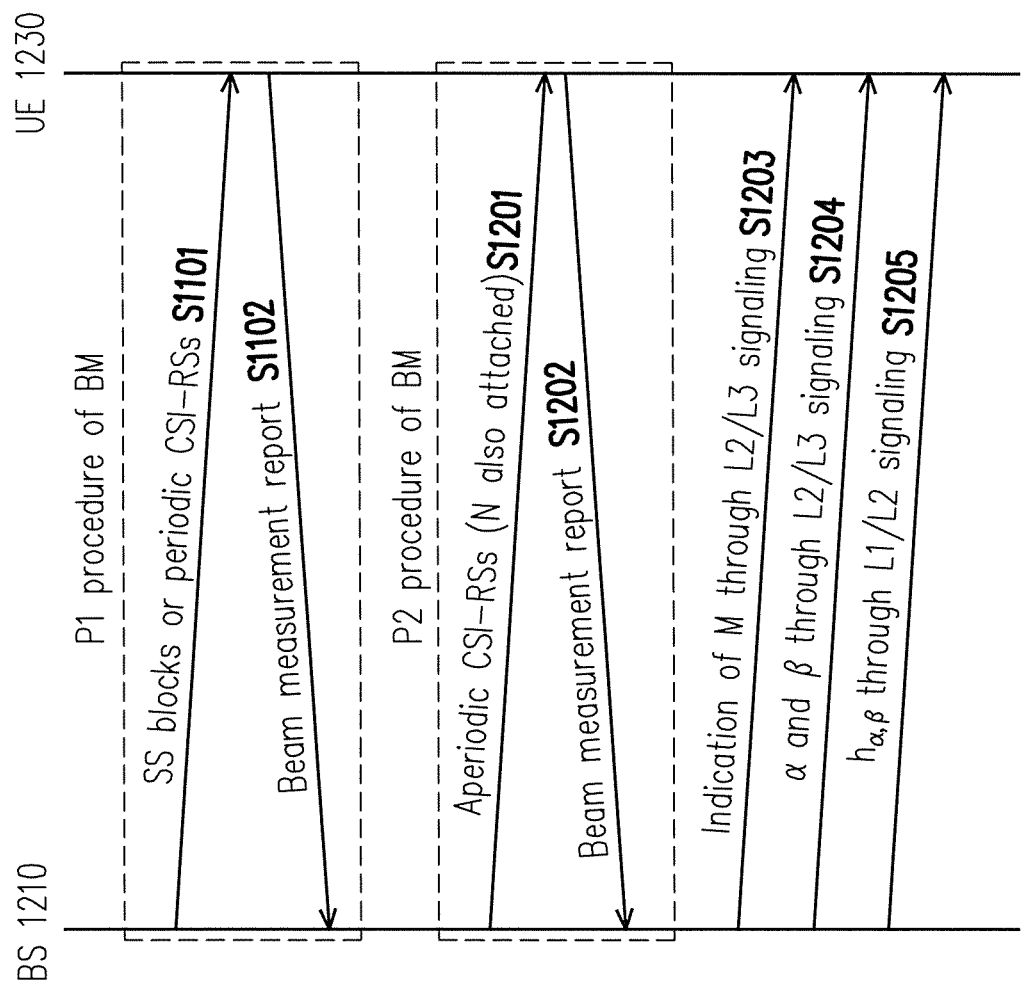
FIG. 12 illustrates a multibeam indication procedure after P2 procedure in accordance with one of the exemplary embodiments of the disclosure.

FIG. 12 illustrates a multibeam indication procedure after P2 procedure in accordance with one of the exemplary embodiments of the disclosure. In FIG. 12, P2 procedure of downlink beam management procedures may include but not limited to steps S1201 and S1202. In step S1201, the BS 1210 may transmit aperiodic CSI-RSs to the UE 1230, wherein the aperiodic CSI-RSs may comprise information of the number of candidate beams N for the BS 1210 and the UE 1230. The BS 1210 and the UE 1230 can be electronic devices which perform the disclosed method mentioned above. In response to receiving the aperiodic CSI-RSs from the BS 1210, in step S1202, the UE 1230 may transmit a beam measurement report to the BS 1210.

After the P2 procedure of downlink beam management procedures, the BS 1210 may determine the number of the active beams M based on the beam measurement report received from the UE 1230 in step S1203. The number of the candidate beams N and the number of the active beams M are known to both the BS 1210 and the UE 1230 after step S1203 is finished. Therefore, in step S1204, the BS 1210 may transmit a first indicator α and a second indicator β via an L2 signaling and/or an L3 signaling, wherein the first indicator α and the second indicator β may assist the UE 1230 to select a beam group to be used. Since the beam group to be used is determined, in step S1205, the BS 1210 may transmit a beam indicator $h_{\alpha,\beta}$ via an L1 signaling or an L2 signaling to the UE 1230.

Figure 13A:
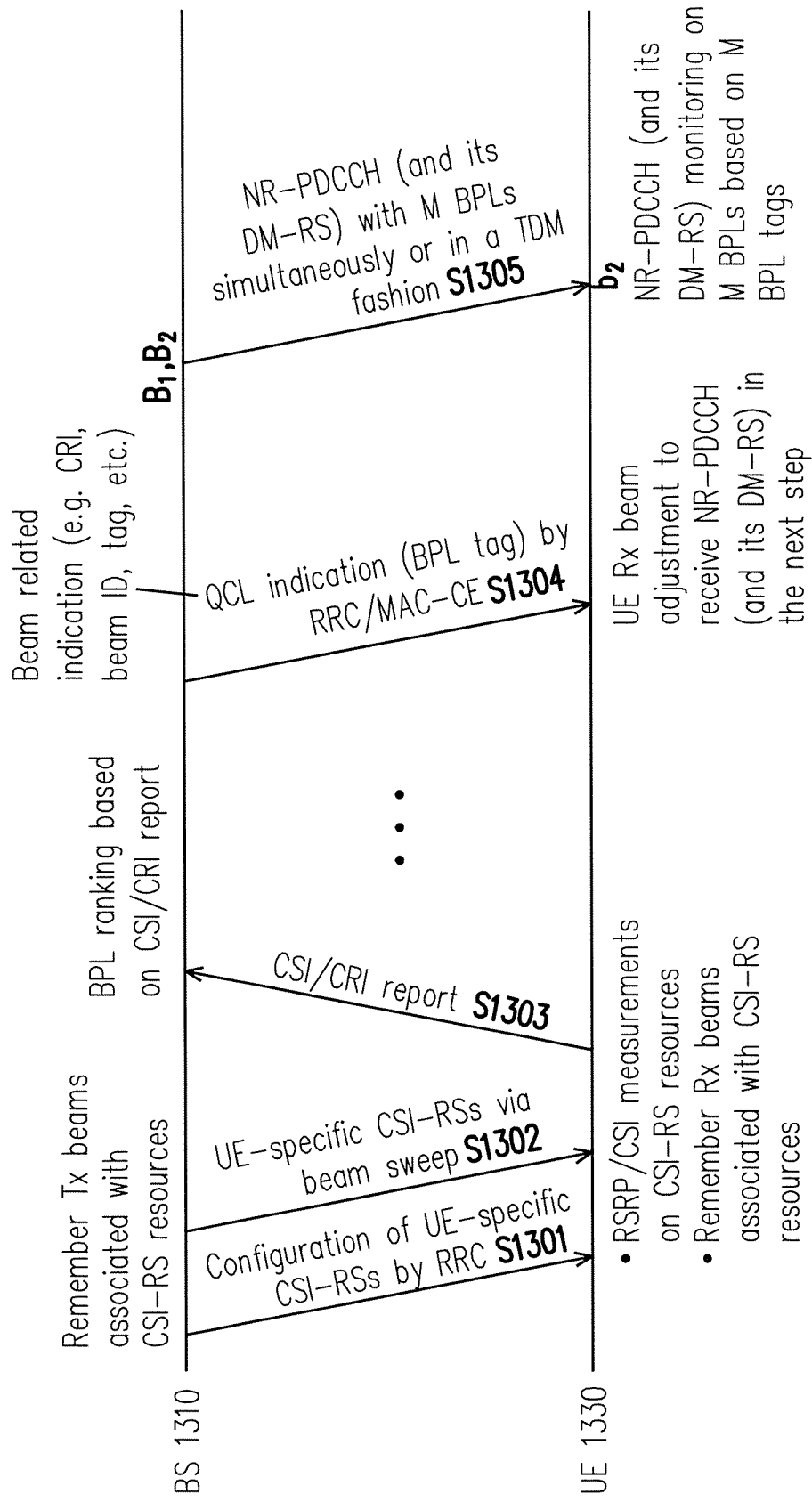
FIG. 13A illustrates a signaling diagram of BPL tag based beam indication between CSI-RS resources and new radio physical downlink control channel (NR-PDCCH)/demodulation reference signal (DM-RS) in accordance with one of the exemplary embodiments of the disclosure.

FIG. 13A illustrates a signaling diagram of BPL tag based beam indication between CSI-RS resources and new radio physical downlink control channel (NR-PDCCH)/demodulation reference signal (DM-RS) in accordance with one of the exemplary embodiments of the disclosure, wherein said BPL tag based beam indication can be implemented by using the disclosed beam indication method. In FIG. 13A, the BS 1310 would remember Tx beams of the BS 1310 which are associated with the CSI-RS resources, and the BS 1310 can send a configuration of UE-specific CSI-RSs via an RRC message in step S1301.

After the information of CSI-RS configuration is known to the UE 1304, in step S1302, the BS 1310 can send the UE-specific CSI-RSs to the UE 1330 via beam sweep. In response to receive the UE-specific CSI-RSs from the BS 1310, the UE 1330 performs RSRP or CSI measurement on the CSI-RS resources and remembers Rx beams of the UE 1330 which are associated with the CSI-RS resources. The UE 1330 may thus send a CSI or CRI report to the BS 1310 based on the RSRP or CSI measurement result in step S1303. The BS 1310 may order a ranking of BPLs between the BS 1310 and the UE 1330 based on the CSI or CRI report received from the UE 1330. That is, the BS 1310 would select preferred BPLs which will be used for beam indication between the BS 1310 and the UE 1330. To reach a common understanding with the UE 1330 on Tx beams of the BS 1310, the BS 1310 may send a BPL tag based beam indication to the UE 1330 via an L3 signaling (e.g. RRC) or an L2 signaling (e.g. MAC-CE) in step S1304. The UE 1330 can perform UE Rx beams adjustment to receive the NR-PDCCH (and its DM-RS) in the next step based on the BPL tag based beam indication. In step S1305, the BS 1310 may send an NR-PDCCH (and its DM-RS) through active Tx beams $B_1$ and $B_2$ and the UE 1330 may receive the NR-PDCCH (and its DM-RS) through active Rx beam $b_2$ based on the BPL tag based beam indication, wherein the active BPLs could be active simultaneously or in a time division multiplexing (TDM) manner.

Figure 13B:
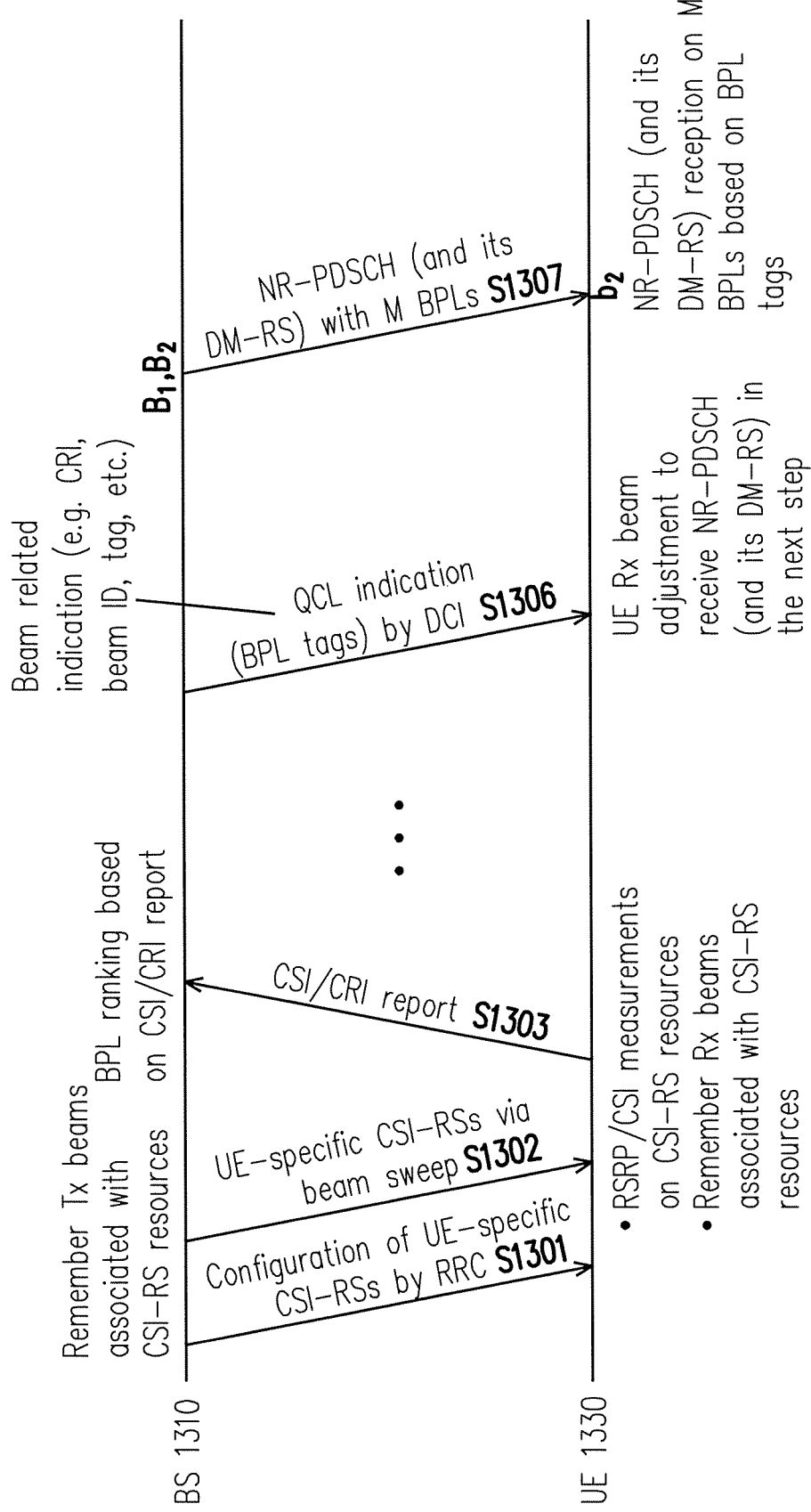
FIG. 13B illustrates a signaling diagram of BPL tag based beam indication between CSI-RS resources and new radio PDSCH (NR-PDSCH) in accordance with one of the exemplary embodiments of the disclosure.

The disclosed beam indication method could also be implemented for physical downlink shared channel (PDSCH). FIG. 13B illustrates a signaling diagram of BPL tag based beam indication between CSI-RS resources and new radio PDSCH (NR-PDSCH) in accordance with one of the exemplary embodiments of the disclosure, wherein said BPL tag based beam indication can be implemented by using the disclosed beam indication method. In FIG. 13B, after step S1303 is completed, the BS 1310 may send a BPL tag based beam indication to the UE 1330 via DCI or MAC-CE in step S1306. The UE 1330 can perform UE Rx beams adjustment to receive the NR-PDSCH (and its DM-RS) in the next step based on the BPL tag based beam indication. In step S1307, the BS 1330 may send a NR-PDSCH (and its DM-RS) through active Tx beams $B_1$ and $B_2$ and the UE 1330 may receive the NR-PDSCH (and its DM-RS) through active Rx beam $b_2$ based on the BPL tag based beam indication.

Figure 13C:
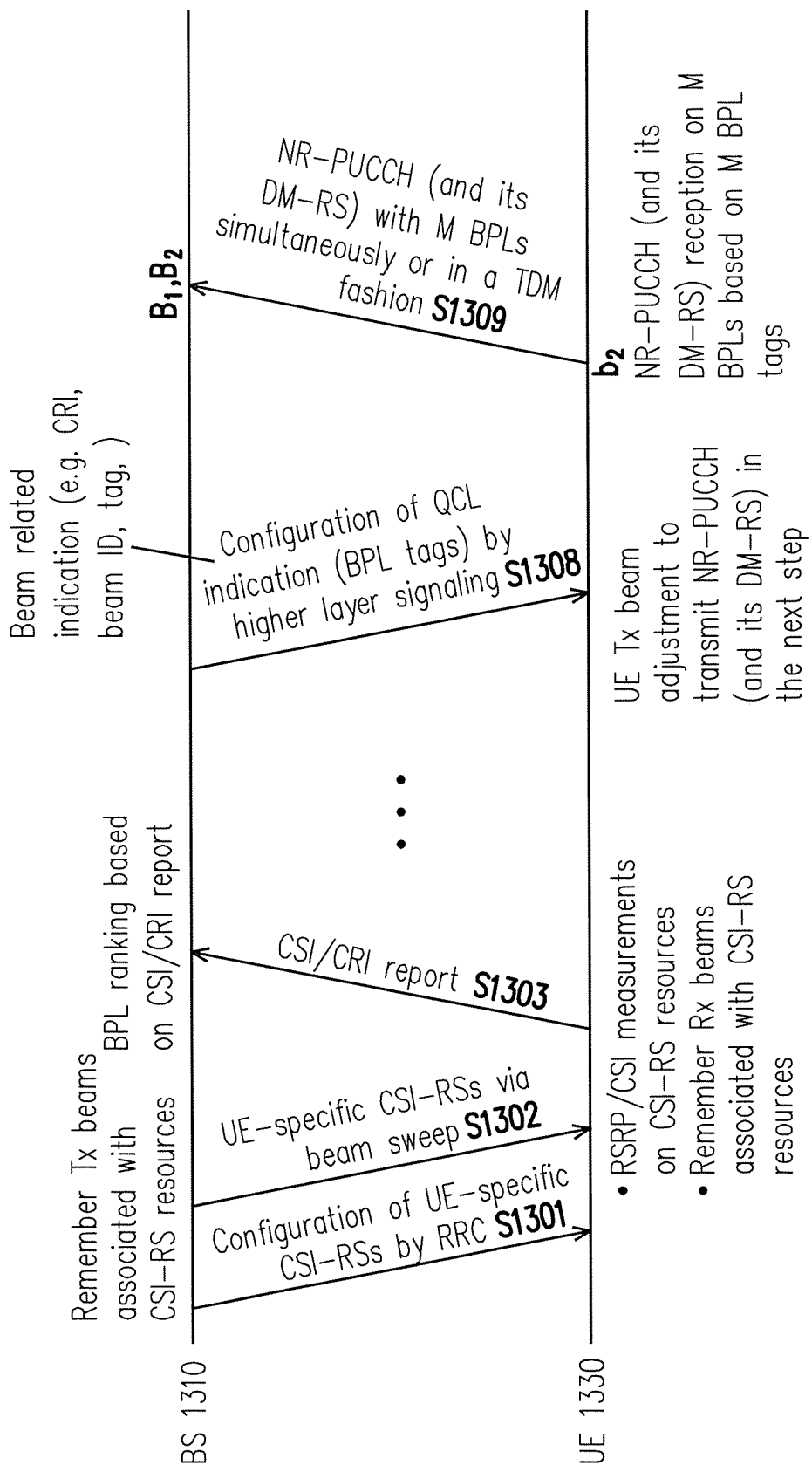
FIG. 13C illustrates a signaling diagram of BPL tag based beam indication between CSI RS resources and new radio physical uplink control channel (NR-PUCCH) in accordance with one of the exemplary embodiments of the disclosure.

Except for downlink resource indication, the disclosed beam indication method could also be implemented for uplink resource indication. FIG. 13C illustrates a signaling diagram of BPL tag based beam indication between CSI-RS resources and new radio physical uplink control channel (NR-PUCCH) in accordance with one of the exemplary embodiments of the disclosure, wherein said BPL tag based beam indication can be implemented by using the disclosed beam indication method. In FIG. 13C, after step S1303 is completed, the BS 1310 may send a BPL tag based beam indication to the UE 1330 via an L3 signaling (e.g. RRC) or an L2 signaling (e.g. MAC-CE) in step S1308. The UE 1330 can perform UE Tx beams adjustment to transmit the NR-PUCCH (and its DM-RS) in the next step. If there is a Tx/Rx beam correspondence at the BS 1310 and the UE 1330, then in step S1309, the UE 1330 may send an NR-PUCCH (and its DM-RS) through active Tx beam b2 (b2 is Tx beam in uplink case) and the BS 1310 may receive the NR-PUCCH (and its DM-RS) through Rx beams B1 and B2 (B1 and B2 are Rx beams in uplink case) based on the BPL tag based beam indication.

Figure 13D:
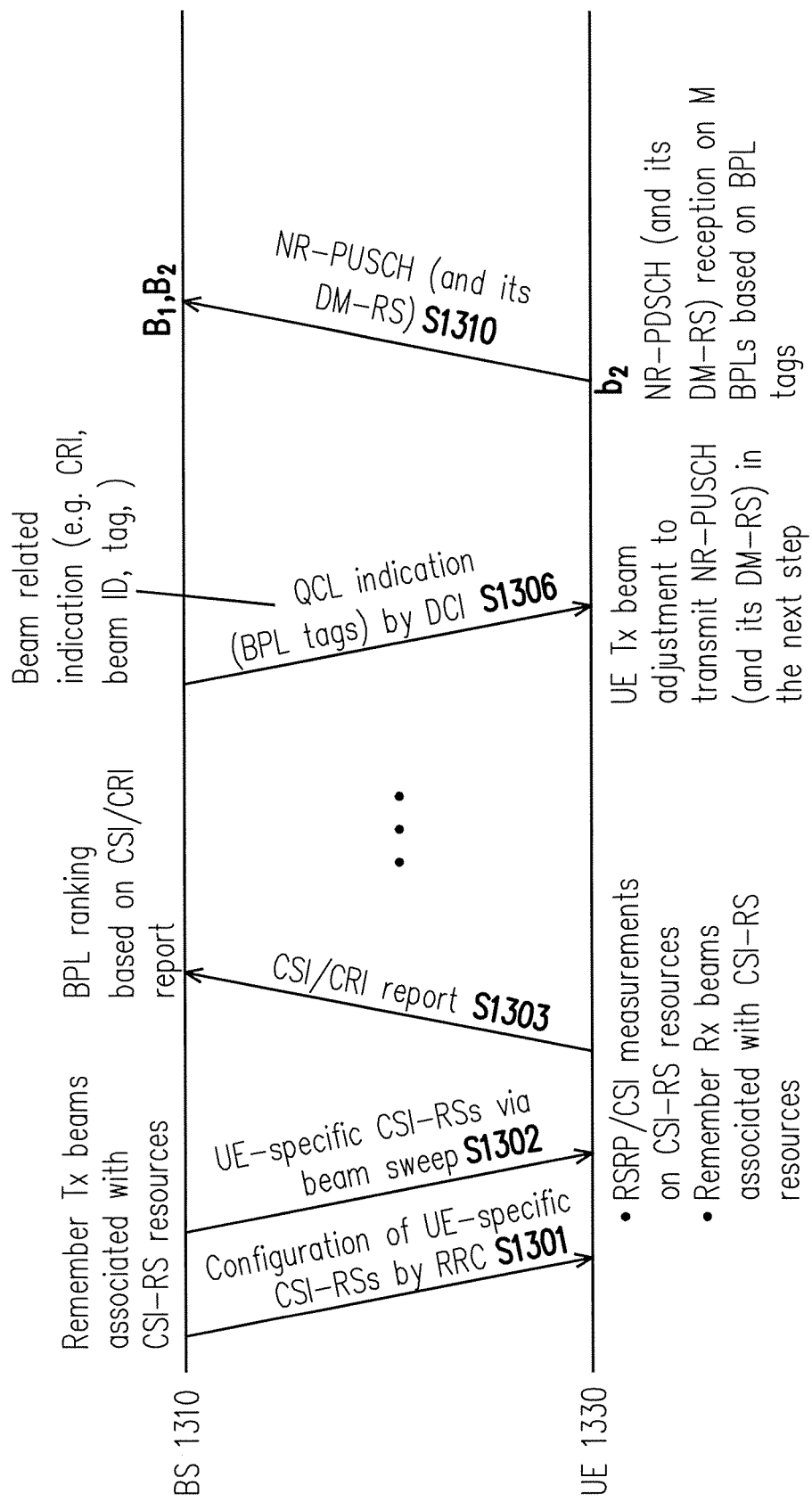
FIG. 13D illustrates a signaling diagram of BPL tag based beam indication between CSI-RS resources and new radio PUSCH (NR-PUSCH) in accordance with one of exemplary embodiments of the disclosure.

The disclosed beam indication method could also be implemented for physical uplink shared channel (PUSCH). FIG. 13D illustrates a signaling diagram of BPL tag based beam indication between CSI-RS resources and new radio PUSCH (NR-PUSCH) in accordance with one of exemplary embodiments of the disclosure, wherein said BPL tag based beam indication can be implemented by using the disclosed beam indication method. In FIG. 13D, after step S1303 is completed, the BS 1310 may send a BPL tag based beam indication to the UE 1330 via DCI or MAC-CE in step S1306. The UE 1330 can perform UE Tx beams adjustment to transmit the NR-PUSCH (and its DM-RS) in the next step. If there is a Tx/Rx beam correspondence at the BS 1310 and the UE 1330, then in step S1310, the UE 1330 may send an NR-PUSCH (and its DM-RS) through active Tx beam b2 (b2 is Tx beam in uplink case) and the BS 1310 may receive the NR-PUSCH (and its DM-RS) through Rx beams B1 and B2 (B1 and B2 are Rx beams in uplink case) based on the BPL tag based beam indication.

Figure 13E:
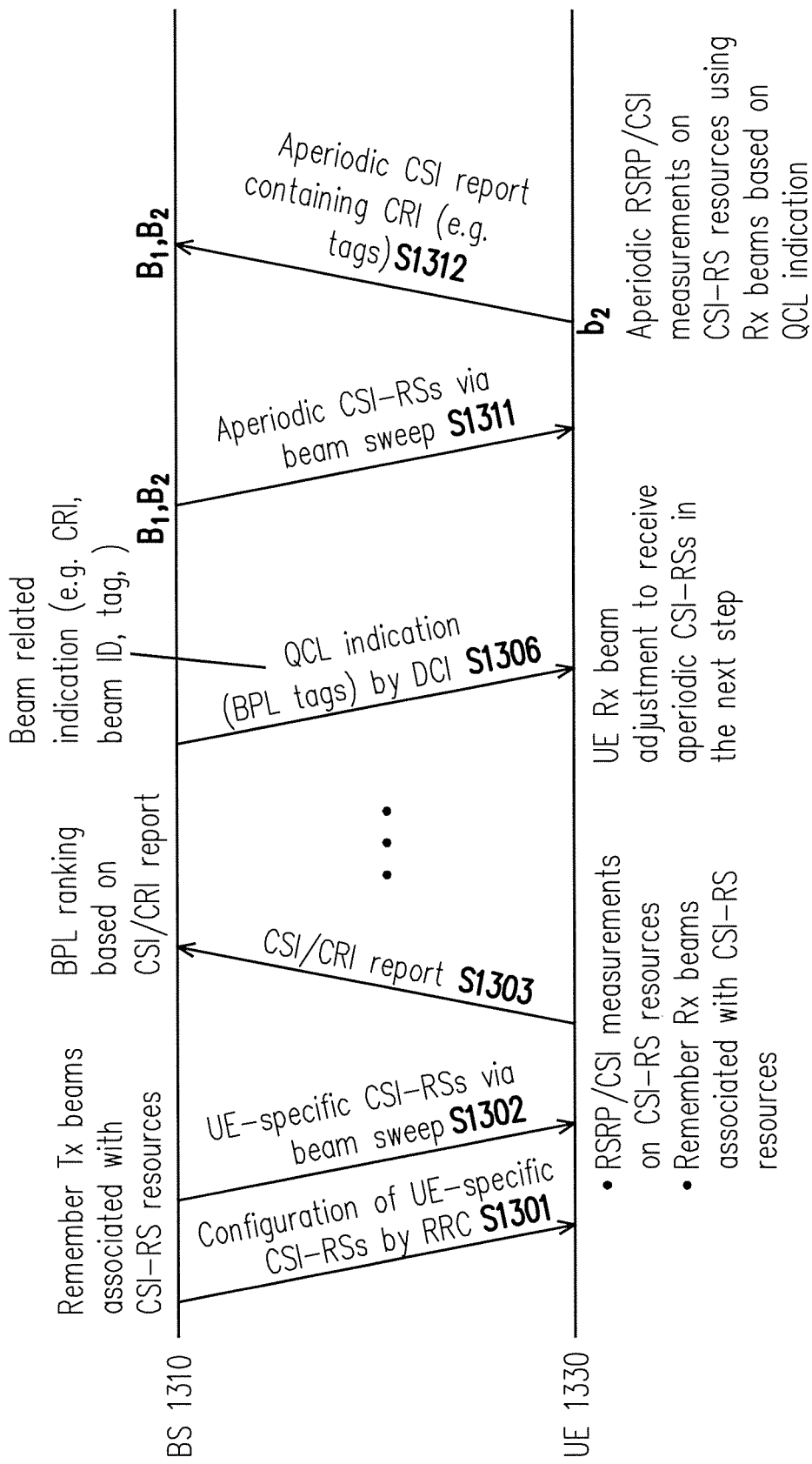
FIG. 13E illustrates a signaling diagram of BPL tag based beam indication between CSI-RS resources for P2 downlink beam management procedures procedure in accordance with one of exemplary embodiments of the disclosure.

The disclosed beam indication method could also be implemented in P2 downlink beam management procedure. FIG. 13E illustrates a signaling diagram of BPL tag based beam indication between CSI-RS resources for P2 downlink beam management procedure in accordance with one of exemplary embodiments of the disclosure, wherein said BPL tag based beam indication can be implemented by using the disclosed beam indication method. In FIG. 13E, after step S1303 is completed, the BS 1310 may send a BPL tag based beam indication to the UE 1330 via DCI or MAC-CE in step S1306. The UE 1330 can perform UE Rx beams adjustment to receive the aperiodic CSI-RSs in the next step based on the BPL tag based beam indication. In FIG. 13E, after step S1306 is completed, the BS 1310 may send aperiodic CSI-RSs to the UE 1330 via beam sweep on $B_1$ and $B_2$ and the UE 1330 may receive the aperiodic CSI-RSs through active Rx beam $b_2$ based on the BPL tag based beam indication in step S1311. In response to receive the aperiodic CSI-RSs from the BS 1310, the UE 1330 performs RSRP or CSI measurement on the aperiodic CSI-RS resource based on the BPL tag based beam indication received in step S1306. In step S1312, the UE 1330 may send an aperiodic CSI-RS report which may contain such as BPL tags to inform the BS 1310 the BPLs which the UE 1330 prefers.

Figure 13F:
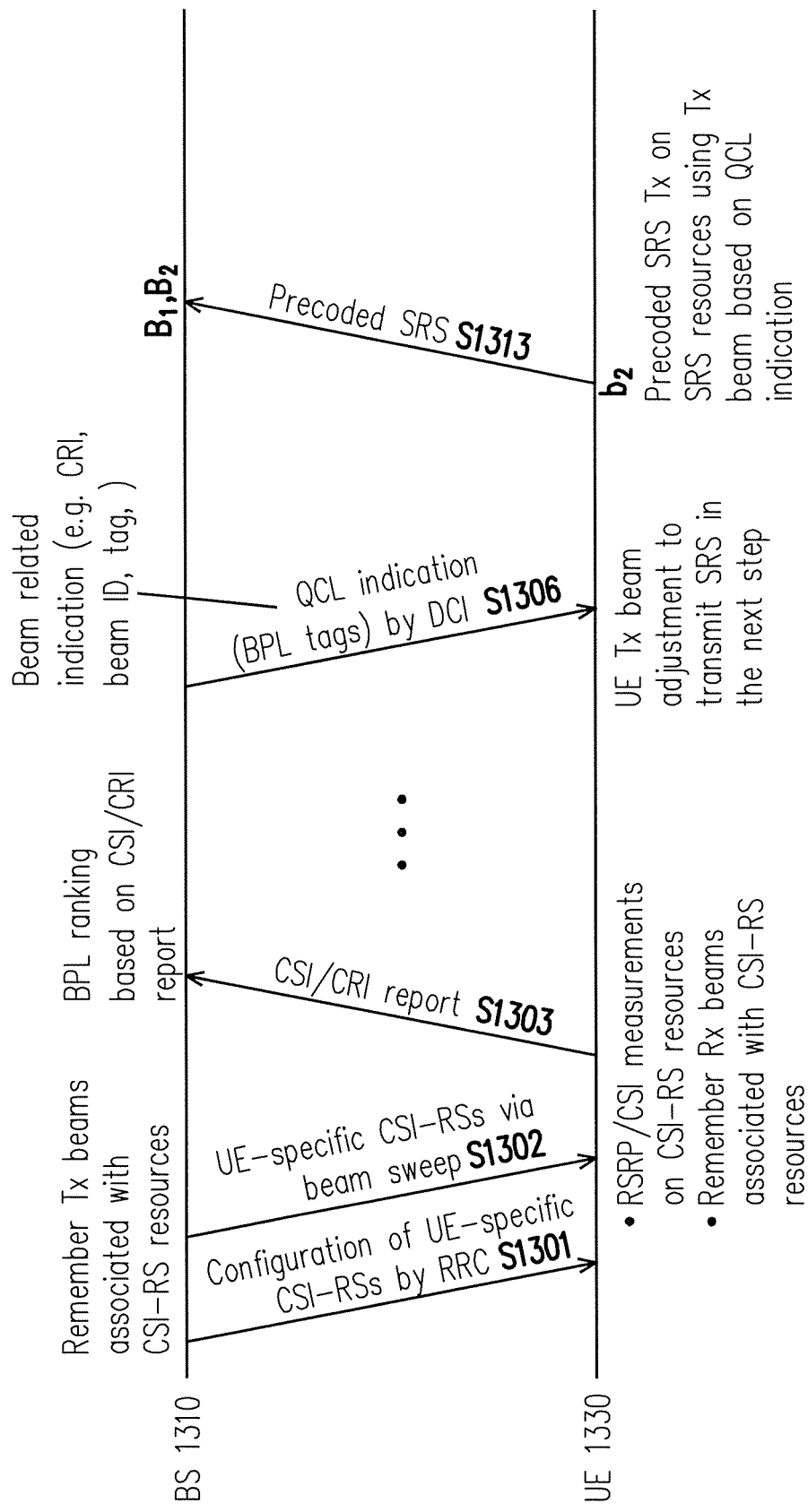
FIG. 13F illustrates a signaling diagram of BPL tag based QCL indication between CSI-RS resources for U2 downlink beam management procedures procedure in accordance with one of exemplary embodiments of the disclosure.

The disclosed beam indication method could also be implemented in U2 downlink beam management procedure. FIG. 13F illustrates a signaling diagram of BPL tag based beam indication between CSI-RS resources for U2 downlink beam management procedure in accordance with one of exemplary embodiments of the disclosure, wherein said BPL tag based beam indication can be implemented by using the disclosed beam indication method. In FIG. 13F, after step S1303 is completed, the BS 1310 may send a BPL tag based beam indication to the UE 1330 via DCI or MAC-CE in step S1306. The UE 1330 can perform UE Tx beams adjustment to transmit the sounding reference signals (SRSs) in the next step. If there is a Tx/Rx beam correspondence at the BS 1310 and the UE 1330, then in step S1313, the UE 1330 may send SRSs through active Tx beam b2 (b2 is Tx beam in UL case) and the BS 1310 may receive the SRSs through Rx beams B1 and B2 (B1 and B2 are Rx beams in UL case) based on the BPL tag based beam indication in step S1313.

In view of the aforementioned descriptions, the present disclosure is suitable for being used in a multibeam system and is able to perform beam group indication by sending indicator which represents a beam group subset instead of a single beam, thus signaling overhead for beam indication could be reduced. It should be noted that this disclosure does not require all the aforementioned advantages.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations could be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:
1. A beam indication method for a multibeam wireless communication system, the method comprising:
    obtaining a number of candidate beams N and a number of active beams M to determine a plurality of beam groups, wherein the beam groups are selections of the M active beams from the N candidate beams, wherein N>M≥1, each of the beam groups comprises the M active beams, and a number of the beam groups is

$$\frac{N!}{M!(N-M)!};$$

extracting a plurality of different sets of beam groups from the beam groups respectively comprising the M active beams, wherein the plurality of sets of beam groups comprise a first beam group set;

assigning a first indicator to the first beam group set, wherein the first beam group set comprises at least one of the beam groups respectively comprising the M active beams; and assigning a beam indicator to one of the beam groups in the first beam group set and generating a beam indication codebook according to the first indicator and the beam indicator, wherein the one of the beam groups in the first beam group set is indicated by both the first indicator of the first beam group set and the beam indicator in the beam indication codebook.

2. The beam indication method according to claim 1, wherein a number of bits of the first indicator is $\lceil \log_2 K_{0,0} \rceil$, wherein $K_{0,0}$ is a number of the plurality of sets of beam groups.

3. The beam indication method according to claim 1, further comprising:
  extracting a plurality of subsets of the beam groups from the first beam group set, wherein the plurality of subsets of the beam groups comprise a first beam group subset; and
  assigning a second indicator to the first beam group subset,
  wherein the step of assigning the beam indicator to one of the beam groups in the first beam group set to generate the beam indication codebook for beam indication according to the first indicator and the beam indicator comprising:
  assigning the beam indicator to one of the beam groups in the first beam group subset of the first beam group set based on a number of the beam groups in the first beam group subset.

4. The beam indication method according to claim 3, wherein a number of bits of the second indicator is $\lceil \log_2 K_{1,0} \rceil$, wherein $K_{1,0}$ is a number of the plurality of subsets of the beam groups.

5. The beam indication method according to claim 3, wherein a number of bits of the beam indicator is $\lceil \log_2 H_{\alpha,\beta} \rceil$, wherein $H_{\alpha,\beta}$ is the number of the beam groups in the first beam group subset of the first beam group set, $\alpha$ is the first indicator, and $\beta$ is the second indicator.

6. The beam indication method according to claim 3, wherein the plurality of sets of beam groups and the plurality of subsets of the beam groups are extracted according to a channel property, and the channel property comprises a multipath scatting condition or mobility condition of a user equipment (UE).

7. The beam indication method according to claim 6, wherein the plurality of sets of beam groups are extracted from the beam groups based on beam consecutive level of the active beams, as the channel property is the multipath scatting condition; and the plurality of sets of beam groups are extracted based on beam overlap level of the active beams, as the channel property is the mobility condition of the UE.

8. The beam indication method according to claim 3, further comprising:
  transmitting or receiving the first indicator and the second indicator via an L3 signaling or an L2 signaling based on the beam indication codebook.

9. The beam indication method according to claim 8, wherein the L3 signaling comprises a radio resource control (RRC) message and the L2 signaling comprises a medium access control (MAC) control element (CE).

10. The beam indication method according to claim 1, further comprising:
  transmitting or receiving the beam indicator via an L1 signaling or an L2 signaling based on the beam indication codebook.

11. The beam indication method according to claim 10, wherein the L1 signaling comprises a downlink control information (DCI) and the L2 signaling comprises a medium access control (MAC) control element (CE).

12. The beam indication method according to claim 1, wherein the number of candidate beams N is determined in a P1 procedure or a P2 procedure of downlink beam management procedures.

13. The beam indication method according to claim 3, wherein the first indicator, the second indicator, and the beam indicator are transmitted after a P1 procedure but before a P2 procedure of downlink beam management procedures.

14. The beam indication method according to claim 3, wherein the first indicator, the second indicator, and the beam indicator are transmitted after a P1 procedure and a P2 procedure of downlink beam management procedures.

15. An electronic device, comprising:
  a storage medium; and
  a processor coupled to the storage medium, and configured to:
  obtain a number of candidate beams N and a number of active beams M to determine a plurality of beam groups, wherein the beam groups are selections of the M active beams from the N candidate beams, wherein N>M≥1, each of the beam groups comprises the M active beams, and a number of the beam groups is $$\frac{N!}{M!(N-M)!};$$

extract a plurality of different sets of beam groups from the beam groups respectively comprising the M active beams, wherein the plurality of sets of beam groups comprise a first beam group set;
  assign a first indicator to the first beam group set, wherein the first beam group set comprises at least one of the beam groups respectively comprising the M active beams; and
  assign a beam indicator to one of the beam groups in the first beam group set and generating a beam indication codebook according to the first indicator and the beam indicator, wherein the one of the beam groups in the first beam group set is indicated by both the first indicator of the first beam group set and the beam indicator in the beam indication codebook.

16. The electronic device according to claim 15, wherein a number of bits of the first indicator is $\lceil \log_2 K_{0,0} \rceil$, wherein $K_{0,0}$ is a number of the plurality of sets of beam groups.

17. The electronic device according to claim 15, wherein the processor is further configured to:
  extract a plurality of subsets of the beam groups from the first beam group set, wherein the plurality of subsets of the beam groups comprise a first beam group subset; and
  assign a second indicator to the first beam group subset, wherein the processor is further configured to:
  assign the beam indicator to one of the beam groups in the first beam group subset of the first beam group set based on a number of the beam groups in the first beam group subset.

18. The electronic device according to claim 17, wherein a number of bits of the second indicator is $\lceil \log_2 K_{1,0} \rceil$, wherein $K_{1,0}$ is a number of the plurality of subsets of the beam groups.

19. The electronic device according to claim 17, wherein a number of bits of the beam indicator is $\lceil \log_2 H_{\alpha,\beta} \rceil$, wherein $H_{\alpha,\beta}$ is the number of the beam groups in the first beam group subset of the first beam group set, a is the first indicator, and β is the second indicator.

20. The electronic device according to claim 17, wherein the plurality of sets of beam groups and the plurality of subsets of the beam groups are extracted according to a channel property, and the channel property comprises a multipath scatting condition or a mobility condition of a user equipment (UE).

21. The electronic device according to claim 20, wherein the plurality of sets of beam groups are extracted from the beam groups based on beam consecutive level of the active beams, as the channel property is the multipath scatting condition; and the plurality of sets of beam groups are extracted based on beam overlap level of the active beams, as the channel property is the mobility condition of the UE.

22. The electronic device according to claim 17, wherein the electronic device further comprises a transceiver coupled to the processor, and the processor further configured to:
transmit or receive the first indicator and the second indicator via an L3 signaling or an L2 signaling based on the beam indication codebook.

23. The electronic device according to claim 22, wherein the L3 signaling comprises a radio resource control (RRC) message and the L2 signaling comprises a medium access control (MAC) control element (CE).

24. The electronic device according to claim 15, wherein the electronic device further comprises a transceiver coupled to the processor, and the processor further configured to:
transmit or receive the beam indicator via an L1 signaling or an L2 signaling based on the beam indication codebook.

25. The electronic device according to claim 24, wherein the L1 signaling comprises a downlink control information (DCI) and the L2 signaling comprises a medium access control (MAC) control element (CE).

26. The electronic device according to claim 15, wherein a number of candidate beams N is determined in a P1 procedure or a P2 procedure of downlink beam management procedures.

27. The electronic device according to claim 17, wherein the first indicator, the second indicator, and the beam indicator are transmitted after a P1 procedure but before a P2 procedure of downlink beam management procedures.

28. The electronic device according to claim 17, wherein the first indicator, the second indicator, and the beam indicator are transmitted after a P1 procedure and a P2 procedure of downlink beam management procedures.

* * * * *